United States Patent
Brown et al.

(10) Patent No.: US 10,817,582 B2
(45) Date of Patent: Oct. 27, 2020

(54) SYSTEMS AND METHODS FOR PROVIDING CONCOMITANT AUGMENTATION VIA LEARNING INTERSTITIALS FOR BOOKS USING A PUBLISHING PLATFORM

(71) Applicant: Elsevier, Inc., New York, NY (US)

(72) Inventors: Hans-Frederick Brown, San Rafael, CA (US); Christian Michael Fazio, Philadelphia, PA (US); Ethan Paul Furstoss, Toms River, NJ (US); Gboinyee Kevin Tarr, Willingboro, NJ (US); Susanne Marcy Cohen, Philadelphia, PA (US); Daniel Dewitt Barber, Willow Grove, PA (US)

(73) Assignee: Elsevier, Inc., New York, NY (US)

( * ) Notice: Subject to any disclaimer, the term of this patent is extended or adjusted under 35 U.S.C. 154(b) by 0 days.

(21) Appl. No.: 16/517,258

(22) Filed: Jul. 19, 2019

(65) Prior Publication Data

US 2020/0026737 A1    Jan. 23, 2020

Related U.S. Application Data

(60) Provisional application No. 62/701,180, filed on Jul. 20, 2018.

(51) Int. Cl.
*G06F 3/048* (2013.01)
*G06F 16/954* (2019.01)
(Continued)

(52) U.S. Cl.
CPC ....... *G06F 16/954* (2019.01); *G06K 9/00456* (2013.01); *G06K 9/00469* (2013.01);
(Continued)

(58) Field of Classification Search
CPC ...... G06F 3/011; G06F 3/016; G06F 3/04815; G06F 3/017; G06F 16/954; G06T 19/006;
(Continued)

(56) References Cited

U.S. PATENT DOCUMENTS

| 9,317,486 B1 | 4/2016 | Story, Jr. et al. |
| 2003/0229629 A1 | 12/2003 | Jasinschi et al. |

(Continued)

FOREIGN PATENT DOCUMENTS

| CN | 101976463 A | 2/2011 |
| JP | 2014106618 A | 6/2014 |

(Continued)

OTHER PUBLICATIONS

"Make your books interactive in 5 easy steps!" http://www.gamooz.com/howitworks.php Aug. 1, 2018.
(Continued)

*Primary Examiner* — Linh K Pham
(74) *Attorney, Agent, or Firm* — Dinsmore & Shohl LLP

(57) ABSTRACT

A system, method, and electronic device for providing concomitant augmentation via learning interstitials for publications includes activating a scan mode, where the scan mode causes a camera to capture image data; determining the presence of a publication captured in the image data; and analyzing the image data to determine the presence of an augmented reality (AR) identifier. In response to identifying the presence of the AR identifier within the publication captured in the image data, the image data and an AR link that corresponds to the AR identifier is displayed as an AR overlay to the image data of the publication. In response to failing to identify the AR identifier within the publication, a user is prompted to input a page number of the publication; and the AR link that corresponds to the page number of the publication input by the user is displayed in a list view.

20 Claims, 20 Drawing Sheets

(51) Int. Cl.
*G06N 20/00* (2019.01)
*G06K 9/00* (2006.01)
*G06T 19/00* (2011.01)
*G06K 9/20* (2006.01)

(52) U.S. Cl.
CPC ....... *G06K 9/00671* (2013.01); *G06K 9/2063* (2013.01); *G06N 20/00* (2019.01); *G06T 19/006* (2013.01)

(58) Field of Classification Search
CPC ......... G06T 19/00; G06T 11/60; G06T 19/20; G06K 9/00456; G06K 9/00671; G06K 9/2063
See application file for complete search history.

(56) References Cited

U.S. PATENT DOCUMENTS

| | | | | |
|---|---|---|---|---|
| 2012/0209826 | A1* | 8/2012 | Belimpasakis | G06F 16/9537 707/710 |
| 2014/0127667 | A1 | 5/2014 | Iannacone | |
| 2015/0123966 | A1* | 5/2015 | Newman | G06T 19/006 345/419 |
| 2015/0138385 | A1* | 5/2015 | Kim | H04N 5/23206 348/211.99 |
| 2016/0133230 | A1* | 5/2016 | Daniels | G06F 3/147 345/633 |
| 2016/0203645 | A1* | 7/2016 | Knepp | A63F 13/53 345/633 |
| 2016/0217699 | A1* | 7/2016 | Thankavel | G06F 3/0483 |
| 2017/0169598 | A1* | 6/2017 | York | G06T 19/006 |
| 2018/0144524 | A1* | 5/2018 | Lotto | G06F 3/167 |
| 2019/0122435 | A1* | 4/2019 | Prideaux-Ghee | G06T 7/75 |
| 2019/0333275 | A1* | 10/2019 | Wang | G06T 19/006 |
| 2020/0004948 | A1* | 1/2020 | Zhu | G06F 21/36 |
| 2020/0160055 | A1* | 5/2020 | Nakamura | A63F 13/213 |

FOREIGN PATENT DOCUMENTS

| | | |
|---|---|---|
| KR | 101018361 B1 | 3/2011 |
| KR | 20110095746 A | 8/2011 |
| KR | 101561267 B1 | 10/2015 |
| KR | 20180080668 A | 7/2018 |
| WO | 2016167691 A2 | 10/2016 |
| WO | 2018136038 A1 | 7/2018 |

OTHER PUBLICATIONS

Wang, Leo L., Wu, Hao-Hua, Bilici, Nadir, Tenny-Soeiro, Rebecca, "Gunner Goggles: Implementing Augmented Reality into Medical Education," Medicine Meets Virtual Reality 22, IOS Press, 2016.
International Search Report and Written Opinion of the International Searching Authority, dated Nov. 8, 2019, PCT.

* cited by examiner

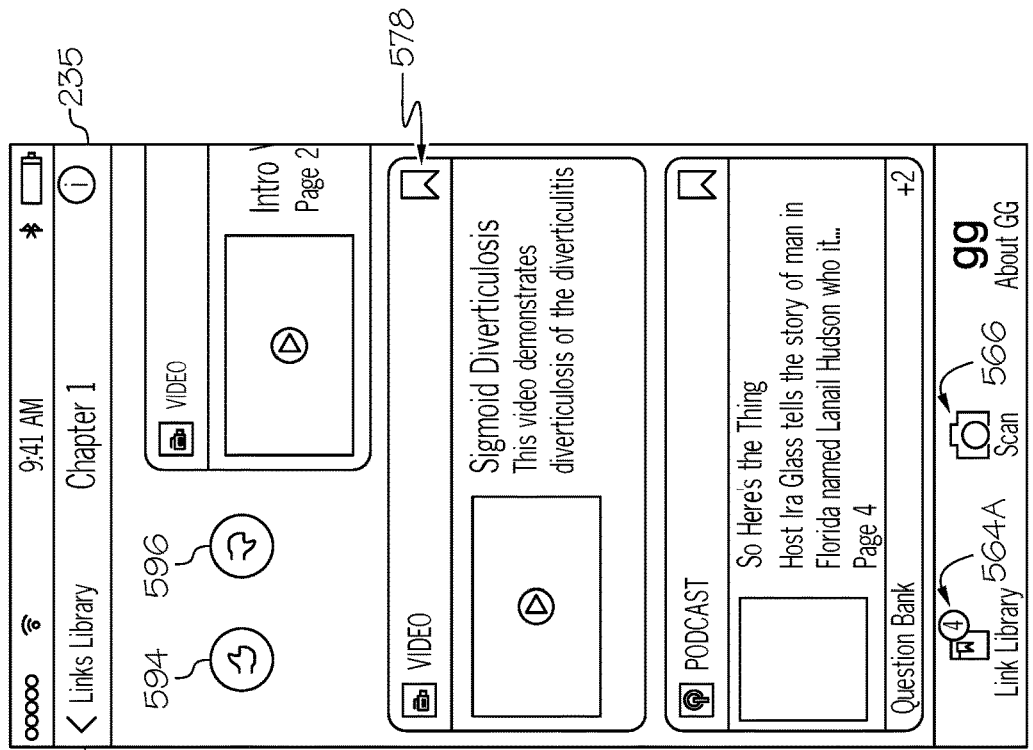
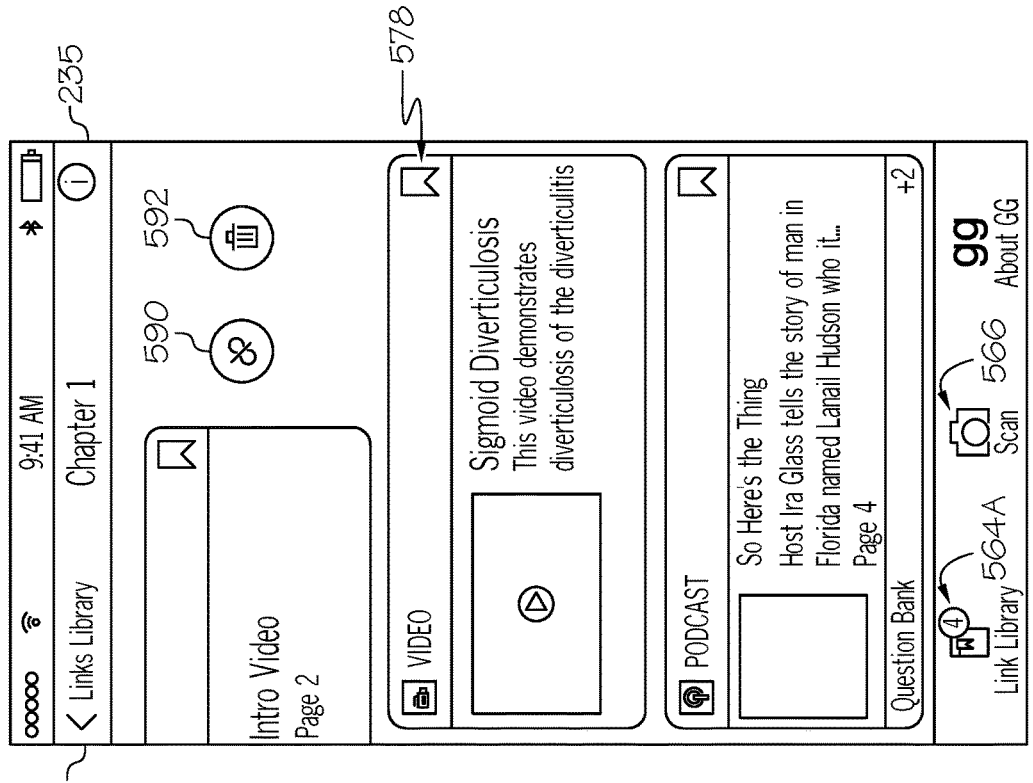
FIG. 12A
FIG. 12B

Presentation

Traditionally, if you wanted to learn about a disease in a review book, you would be expected to read and memorize a block of text similar to the following:

"Huntington disease (HD) is a GABAergic neurodegen-erative disorder that is caused by an autosomal dominant mutation leading to CAG repeats on chromosome4.

Having read (or most likely glazed) through that previous paragraph, do you feel comfortable enough to answer questions about the genetics, presentation, and treatment of HD right now? A week from now? Three weeks from now when you have to take your self exam?

[AR] Here's where AR comes In. Use your GG app to check out how we're able to present HD In different and memorable ways. For visual learners, here's a video or an effective HD mnemonic --->

[AR] If you are an audio learner, here's a link to key points about HD for the shelf --->

[AR] Forgot your neuroanatomy? Here's where the caudate is --->

[AR] What's the difference between chorea. athetosis. and ballismus again? Chorea looks like this --->

Now write a one-line description of HD In your own words in the margins of this page for future reference. It's much easier with AR, right? Like we said, your best friend.

FIG. 14

SYSTEMS AND METHODS FOR PROVIDING CONCOMITANT AUGMENTATION VIA LEARNING INTERSTITIALS FOR BOOKS USING A PUBLISHING PLATFORM

CROSS REFERENCE TO RELATED APPLICATIONS

This application claims priority to U.S. Provisional Application No. 62/701,180, filed Jul. 20, 2018, the contents of which are hereby incorporated by reference in its entirety.

TECHNICAL FIELD

The present specification generally relates to systems and methods for providing an augmentation framework to written text and accessible multimodal content to readers.

BACKGROUND

Learning materials generally include books, electronic based articles and databases, video lectures, audio recordings, visual diagrams, and the like. Each of these materials are generally accessible through independent mediums. Moreover, education programs have increasingly relied upon electronic text and multimedia solutions as education materials for teaching and training students. For example, the field of medicine increasingly uses mobile applications on smartphones and tablets to access and learn information. Many allopathic and osteopathic medical programs provide their students electronic devices and companion applications in hopes of enhancing the interactive experience of medical education. However, while students are generally excited at the prospects of integrating interactive technology into their medical education, their perception quickly changes through the course of medical school. The decline in the positive attitude towards the use of electronic devices is correlated to the poor quality of the interactive experience currently offered by electronic device based media integration.

SUMMARY

In one embodiment, a method of providing concomitant augmentation via learning interstitials for publications. The method includes activating a scan mode, where the scan mode causes a camera of an electronic device to capture image data; determining the presence of a publication captured in the image data; and analyzing the image data of the publication to determine the presence of an augmented reality (AR) identifier. In response to identifying the presence of the AR identifier within the publication captured in the image data, the method further includes displaying, on a display of the electronic device, the image data of the publication and an AR link that corresponds to the AR identifier, where the AR link is displayed as an AR overlay to the image data of the publication. In response to failing to identify the AR identifier within the publication captured in the image data, the method further includes, prompting a user to input a page number of the publication captured in the image data, and displaying the AR link that corresponds to the page number of the publication input by the user, where the AR link is displayed in a list view on the display of the electronic device.

In some embodiments, a system for providing concomitant augmentation via learning interstitials for publications includes an electronic device includes a display and a camera, a processor communicatively coupled to the display and the camera, and a non-transitory, processor-readable memory coupled to the processor. The non-transitory, processor-readable memory includes a machine readable instruction set stored thereon that, when executed by the processor, causes the processor to activate a scan mode, where the scan mode causes the camera of an electronic device to capture image data, determine the presence of a publication captured in the image data, and analyze the image data of the publication to determine the presence of an augmented reality (AR) identifier. In response to identifying the presence of the AR identifier within the publication captured in the image data, the machine readable instruction further causes the processor to display, on the display of the electronic device, the image data of the publication and an AR link that corresponds to the AR identifier, where the AR link is displayed as an AR overlay to the image data of the publication. In response to failing to identify the AR identifier within the publication captured in the image data, the machine readable instruction further causes the processor to prompt a user to input a page number of the publication captured in the image data and display the AR link that corresponds to the page number of the publication input by the user, where the AR link is displayed in a list view on the display of the electronic device.

In some embodiments, an electronic device configured with an application for providing concomitant augmentation via learning interstitials for publications includes a display, a camera, a processor communicatively coupled to the display and the camera, and a non-transitory, processor-readable memory coupled to the processor. The non-transitory, processor-readable memory includes a machine readable instruction set stored thereon that, when executed by the processor, causes the processor to: activate a scan mode, where the scan mode causes the camera of an electronic device to capture image data, determine the presence of a publication captured in the image data, and analyze the image data of the publication to determine the presence of an augmented reality (AR) identifier. In response to identifying the presence of the AR identifier within the publication captured in the image data, the machine readable instruction further causes the processor to display, on the display of the electronic device, the image data of the publication and an AR link that corresponds to the AR identifier, where the AR link is displayed as an AR overlay to the image data of the publication. In response to failing to identify the AR identifier within the publication captured in the image data, the machine readable instruction further causes the processor to prompt a user to input a page number of the publication captured in the image data and display the AR link that corresponds to the page number of the publication input by the user, where the AR link is displayed in a list view on the display of the electronic device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 12A depicts an illustrative example display of the electronic device depicting a list view of the AR links for a particular chapter of the publication and where a user may select an AR link for viewing its corresponding content or provide feedback with respect to the functionality of the AR link, according to one or more embodiments shown and described herein;

FIG. 12B depicts the same illustrative display as FIG. 12A, but FIG. 12B includes a depiction of a display where a user may provide feedback with respect to the appreciation of the content of an AR link, according to one or more embodiments shown and described herein;

FIG. 14 depicts an illustrative example of a digital publishing platform having an extension for authoring Concomitant Interstitials in publications, according to one or more embodiments shown and described herein;

DETAILED DESCRIPTION

Embodiments of the present disclosure relate to systems, methods, and applications for improving the shortcomings and poor quality of interactive experiences offered through electronic devices by providing new and improved systems methods, and applications that provide concomitant augmentations via learning interstitials through an electronic device and a publication. In other words, the systems, methods, and applications described herein provide augmented reality (AR) content associated to publications that a user is reading.

Augmented reality (AR) has the capacity to enhance education (e.g., medical education) through integration of an electronic device into the teaching and/or learning curricula. By definition, AR is the embedding of virtual learning into a physical context. In a recent review, 96% of publications related to augmented reality in health education found that it enhanced learning and that users of AR maintained they would continue to use it in the future. However, it was also found that AR applications in medical education lacked explicit pedagogical theoretical framework. In fact, augmented reality has yet to be applied to textbook education, where there is not only a more explicit pedagogical purpose for AR, but also an unrealized need for its vast potential to enhance the learning experience.

The system and methods described herein detail the different aspects, components, and systems including a companion AR application enabled through an electronic device, for example, for supporting medical education textbooks. As a non-limiting example, medical education textbooks generally consist of textbooks intended to help medical student learn material and prepare for the shelf exams such as those administered by National Board of Medical Examiners [USA].

Although the companion AR applications and the methods/systems described herein were built for medical learning activities, these methods and systems can be utilized more generally. They may provide a book-augmentation framework applicable to any context that involves reading a physical book and accessing multimodal content, and support maintaining attention and focus while accessing content in multiple modalities.

Figure 1:
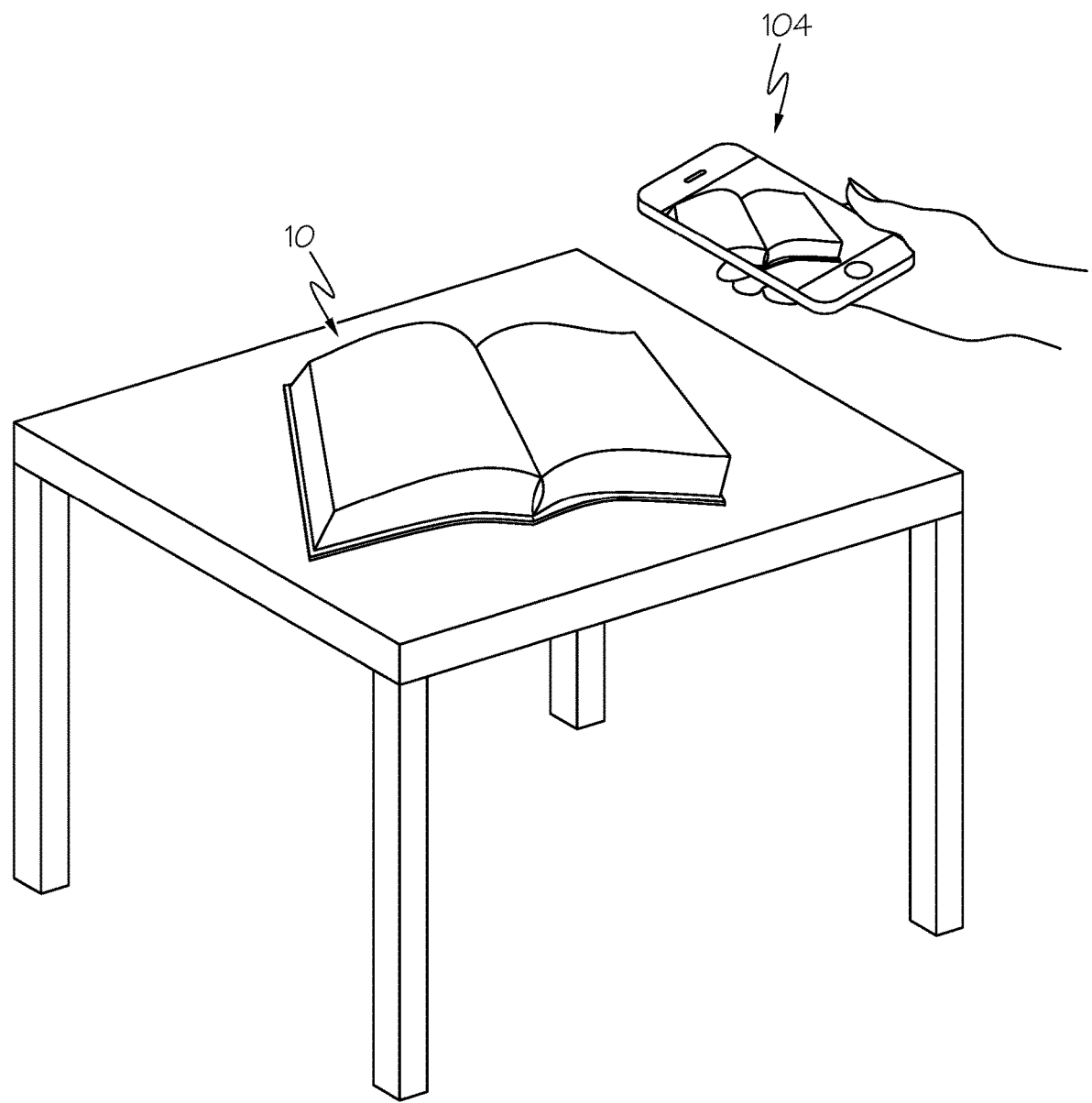
FIG. 1 depicts an illustrative example of an electronic device utilized for providing an augmentation framework to written text and accessible multimodal content to readers, according to one or more embodiments shown and described herein.

As used herein, a concomitant augmentation refers to AR links that support access to learning interstitials such as additional content and/or associated question banks of any kind. The additional content may include books, electronic based articles and databases, videos, audio recordings, visual diagrams, interactive models (2D or 3D) and the like that are contextually associated with physical book elements (e.g., paragraphs, headers, tables, images) and can be quickly recalled with or without these elements. The concomitant augmentations greatly aid studying and learning, especially when they are made available without imposing context-switching (i.e., navigating from the text being read and/or studied) and explicitly require modality controls. For example, as depicted in FIG. 1, an electronic device 104 may be configured with an application that enables a camera on the electronic device to capture image data of a publication 10 (e.g., a book) and in response to capturing the image data of the publication 10 with the electronic device 104 augmented reality links may be provided virtually to access additional learning content associated with the topics of the publication captured in the image data.

Additionally, an extension to digital authoring platform publishing tools and systems that serve editors, authors, and staff is provided. For example, such tools include tools for augmenting and testing concomitant augmentations (i.e., AR links to content and questions) directly when authoring the publication (e.g., before publishing the publication) without having to typeset and create a physical publication proof to experience and test the augmentations (i.e., that AR links to content and questions).

Embodiments of the Concomitant Augmentations via Learning Interstitials are described through reference to four generalized implementations. These include, 1) book layout for augmentation via mobile and AR enable electronic devices, 2) page detection, user development training materials, AR tracking, and AR link display, 3) learning interstitial scoring and dynamic validation, and 4) digital publishing platform extensions for concomitant interstitials authoring in publications. Before discussing the details of the four generalized implementations of the systems, an understanding into how they work together to deliver concomitant augmentations during reading/learning/studying/quizzing activities is provided.

For example, the concomitant augmentations include three user facing components that work together to create augmentations for publications that limit the modalities content is present to keep the studying experience as fluid as possible while a user (e.g., a student) acquires and memorizes information. The first of these include the physical book, which follows a particular layout/template that quickly indicates where certain paragraphs, images, tables or other book elements have been augmented with concomitant augmentations (i.e., additional learning content through AR links). The second includes a mobile application that can scan book pages and detect and/or propose additional learning interstitials (e.g., video clips, PDFs, web links, images, 3D models or the like). The third includes a library of learning interstitials (i.e., AR links) and associated question banks, also contained in the mobile application but accessible without the physical book once they have been activated during the scanning phase of using the mobile application.

The concomitant augmentation and reading, studying, and/or quizzing experience relies on the capability to access AR links apart from scanning the physical book after the initial scanning process. This provides a richer studying experience that does not require a user to constantly use an electronic device with a publication (e.g., a physical book) to access and/or view the corresponding learning interstitials and associated question banks. Additionally, by using environmental cues and/or machine learning models, the need for additional explicit input from the user provides a fluid experience that is tailored for studying and learning content. For example, by using the camera on the electronic device to detect black frames in the image data and using the gyroscope to infer modality changes, such as placing the mobile device on a table next to the book, the content displayed on the electronic device may be automatically updated to accommodate the electronic devices current use by the user. In some embodiments, the system may analyze image data to determine the field of view or focal distance of objects in the image data to further determine when the camera is at a distance that would indicate a distance that is reasonable for capturing a publication (e.g., a book page). For example, if the focal distance of objects in an image is determined to be too far or too short then the system may infer that the electronic device is not scanning a publication. That is, the system may be configured to detect conditions during scanning mode that automatically switch a view on the display of the electronic device from displaying augmented reality overlaid on image data of the publication to an AR list view. The explicit modality mode change, without direct inputs from a user, may provide an improved user experience. Such an approach has not been found in other mobile device learning systems and applications publically accessible through mobile stores.

Finally, also introduced are systems and methods developed for digital publishing platforms, which can serve the editors, authors, staff, teachers, or the like during the inception phase of a book project in adding such learning interstitials and associated question banks directly during the authoring process. This also provides a preview of such learning interstitials without the need to wait for typesetters, layout placement, or book proofs to see how AR identifiers for concomitant augmentations of core teaching material are delivered via the selected learning interstitials (e.g., AR links).

Figure 2A:
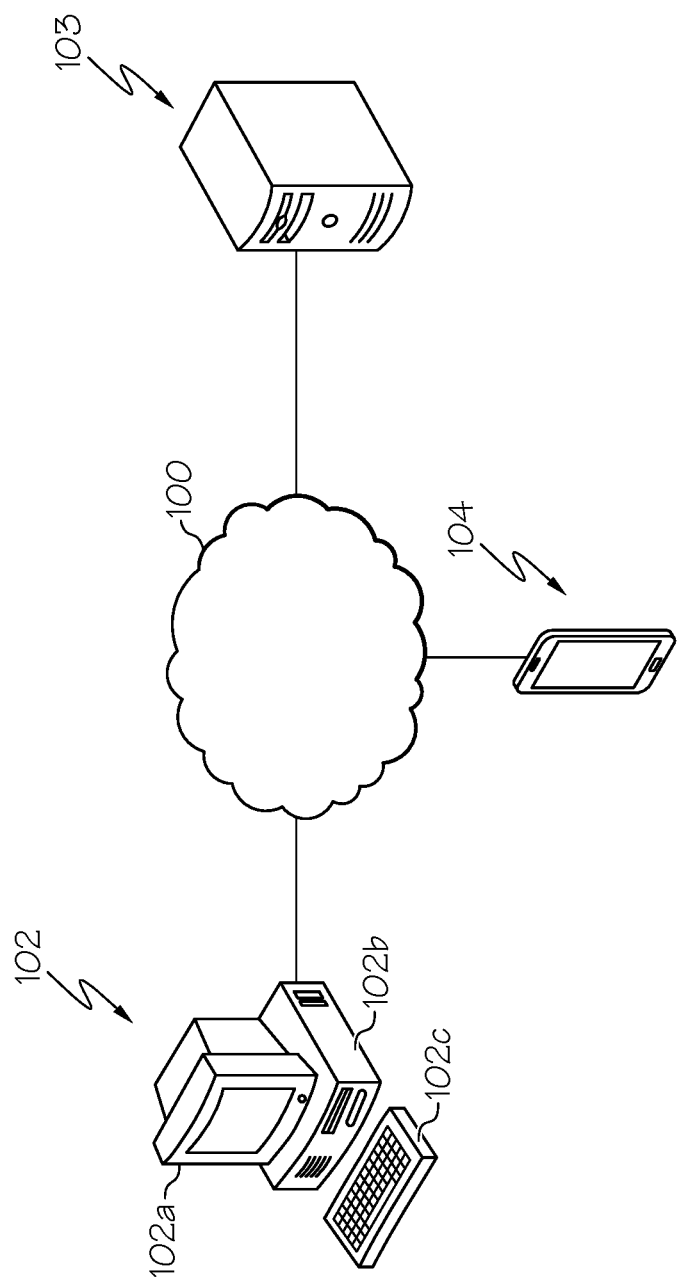
FIG. 2A schematically depicts an example computing network for providing concomitant augmentation via learning interstitials for publications, according to one or more embodiments shown and described herein.

Turning now to the drawings, the systems and methods for providing concomitant augmentation via learning interstitials for publications are now described. The systems and methods may utilize one or more connected devices to provide concomitant augmentation via learning interstitials (e.g., AR links) to a user. As illustrated in FIG. 2A, a network 100 may include a wide area network, such as the internet, a local area network (LAN), a mobile communications network, a public service telephone network (PSTN) and/or other network and may be configured to electronically connect a computing device 102, a server 103 for managing content and training machine learning models, and an electronic device 104 enabled with an application for a user to use with a publication.

The computing device 102 may include a display 102a, a processing unit 102b and an input device 102c, each of which may be communicatively coupled to together and/or to the network 100. The computing device 102 may be used develop augmented reality enabled publication, augmented reality content, question banks, and the like. The computing device 102 may also be utilized to interface with a server 103 to develop, update, and/or repair machine learning models for detecting AR identifiers within a publication.

Additionally, included in FIG. 1 is the electronic device 104. The electronic device 104 may be any mobile or personal computing device such as a laptop, tablet, smartphone, or the like that a user may use to scan a publication and access AR content as described in more detail herein.

It should be understood that while the computing device 102 and the electronic device 104 are depicted as a personal computer and a mobile phone, respectively, and a server 103, these are merely examples. More specifically, in some embodiments, any type of computing device (e.g., mobile computing device, personal computer, server, and the like) may be utilized for any of these components. Additionally, while each of these computing devices is illustrated in FIG. 2A as a single piece of hardware, this is also an example. More specifically, each of the computing device 102, the server 103, and electronic device 104 may represent a plurality of computers, servers, databases, and the like.

Figure 2B:
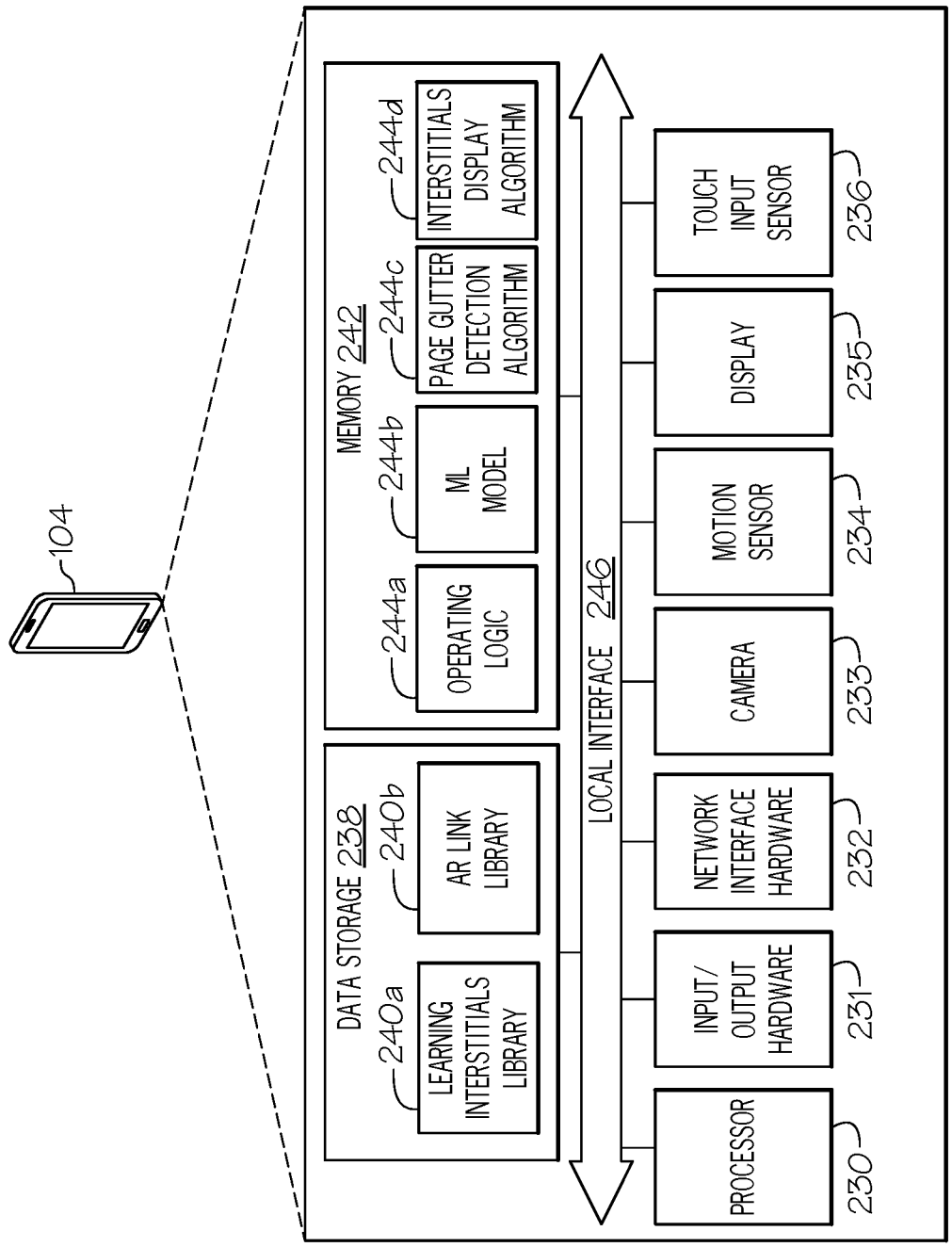
FIG. 2B schematically depicts an example electronic device for providing concomitant augmentation via learning interstitials for publications, according to one or more embodiments shown and described herein.

FIG. 2B depicts an example electronic device 104, from FIG. 2A, while further illustrating the components and data stored thereon for enabling a mobile application to provide AR links and content for publications. The electronic device 104 for scanning publications and providing AR links and content for scanned publications to a user may utilize hardware, software, and/or firmware, according to embodiments shown and described herein. While in some embodiments, the electronic device 104 may be configured as a general-purpose computer with the requisite hardware, software, and/or firmware, in some embodiments, the electronic device 104 may be configured as a special purpose computer designed specifically for performing the functionality described herein.

As illustrated in FIG. 2B, the electronic device 104 may include a processor 230, input/output hardware 231, network interface hardware 232, a camera 233, a motion sensor 234, a display 235, a touch input sensor 236, a data storage component 238, which stores a learning interstitials library 240a and an AR link library 240b, and a memory component 242. The memory component 242 may be machine readable memory (which may also be referred to as a non-transitory processor readable memory). The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 242 may be configured to store operating logic 244a, a machine learning model (ML model) 244b, a page gutter detection algorithm 244c, and a interstitials display algorithm 244d (each of which may be embodied as a computer program, firmware, or hardware, as an example). A local interface 246 is also included in FIG. 2B and may be implemented as a bus or other interface to facilitate communication among the components of the electronic device 104.

The processor 230 may include any processing component(s) configured to receive and execute programming instructions (such as from the data storage component 238 and/or the memory component 242). The instructions may be in the form of a machine readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

The camera 233 may be any device having an array of sensing devices (e.g., pixels) capable of detecting radiation in an ultraviolet wavelength band, a visible light wavelength band, or an infrared wavelength band. The camera 233 may have any resolution. The camera 233 may be an omni-directional camera, or a panoramic camera. In some embodiments, one or more optical components, such as a mirror, fish-eye lens, or any other type of lens may be optically coupled to camera 233.

The motion sensor 234 may include any device capable of detecting acceleration changes in the electronic device 104 and/or roll, pitch, and yaw rotations. For example, the motion sensors 234 may include an accelerometer, a gyroscope, or the like.

The display 235 may include any medium capable of transmitting an optical output such as, for example, a cathode ray tube, light emitting diodes, a liquid crystal display, a plasma display, or the like. Moreover, the display 235 may be a touchscreen enabled by a touch input sensor 236 that, in addition to providing optical information, detects the presence and location of a tactile input upon a surface of or adjacent to the display 235.

It should be understood that the data storage component 238 may reside local to and/or remote from the electronic device 104 and may be configured to store one or more pieces of data for access by the electronic device 104 and/or other components. As illustrated in FIG. 2, the data storage component 238 includes a learning interstitials library 240a which contains AR identifiers for publications and an AR link library 240b which contains the one or more AR links corresponding to the AR identifiers identified within image data of the publication a user is reading and scanning with the electronic device 104.

Included in the memory component 242 are the operating logic 244a, the ML model 244b, the page gutter detection algorithm 244c, and the interstitials display algorithm 244d. The operating logic 244a may include an operating system and/or other software for managing components of the electronic device 104. The ML model 244b includes a machine learning model trained to identify AR identifiers from image data of a publication and associate the identified AR identifiers with an AR link that provides access to supplemental learning content. The page gutter detection algorithm 244c is an algorithm configured to detect page gutters from image data of a publication. The page gutters of a publication may define the portions of a publication where AR links may be displayed as an augmented reality overlay to the image data of the publication captured by the camera. The interstitials display algorithm 244d is an algorithm configured to generate the augmented reality overlay having AR links and displaying the AR links as an overlay to the image data of the publication captured by the camera and displayed simultaneously on the display of the electronic device 104.

It should also be understood that the components illustrated in FIG. 2B are merely exemplary and are not intended to limit the scope of this disclosure. More specifically, while the components in FIG. 2B are illustrated as residing within the electronic device 104, this is merely an example. In some embodiments, one or more of the components may reside external to the electronic device 104. Similarly, while FIG. 2B is directed to the electronic device 104, other components such as the computing device 102 and the server 103 may include similar hardware, software, and/or firmware.

Figure 3A:
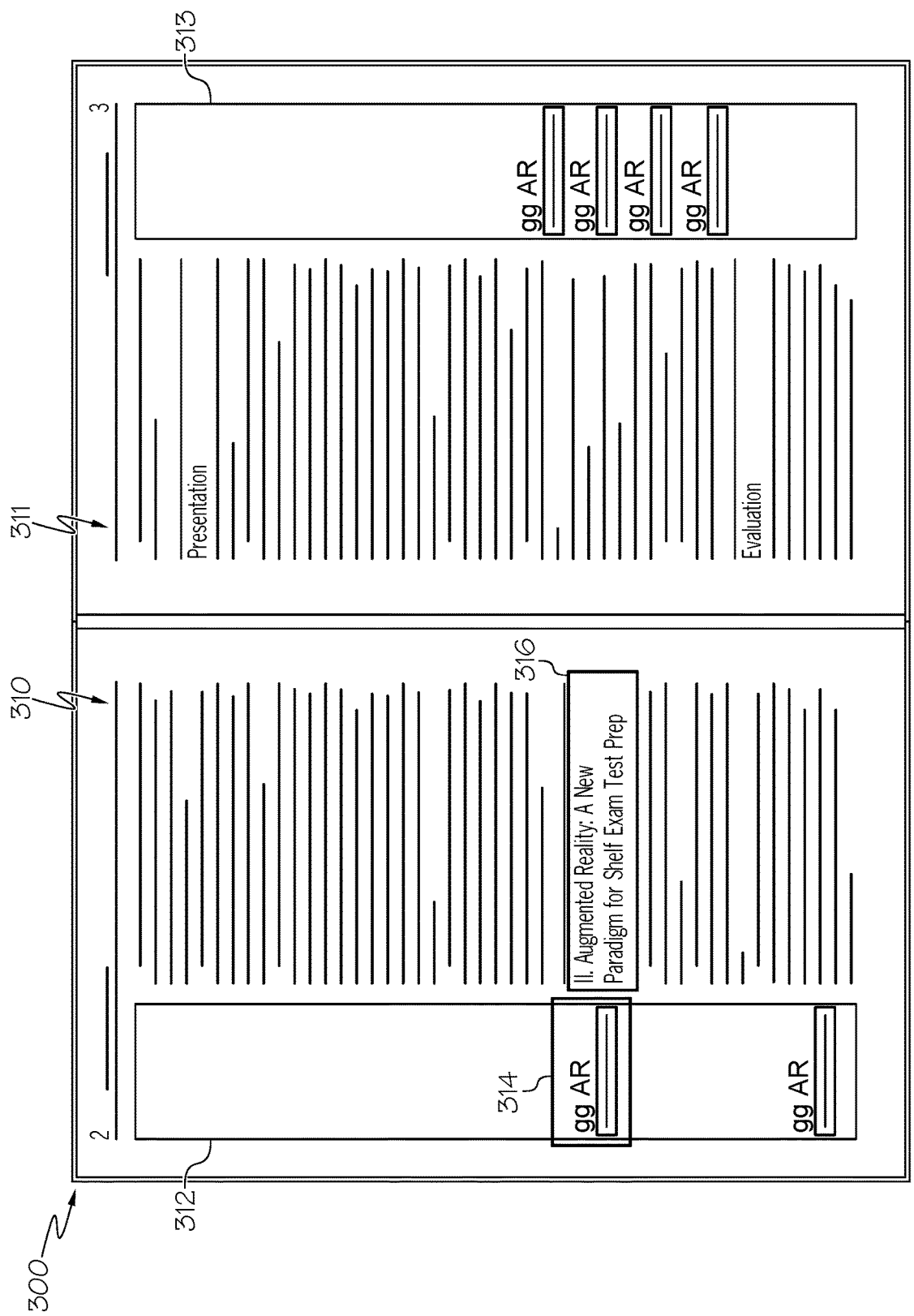
FIG. 3A depicts an illustrative example of a published layout for a book adapted for scanning by an electronic device, according to one or more embodiments shown and described herein.

Turning now to FIG. 3A, an example publication having embedded AR identifiers 314 for use with the electronic device 104 is depicted. In some embodiments, a predefined layout for augmentation via an electronic device 104 may be implemented. FIG. 3A depicts an illustrative example of a published layout for a book adapted for scanning by an electronic device 104. For example, to optimize scanning results and consistency across a digital publishing platform a common publication layout 300 and template for chapters may be developed. Each chapter page 310 and 311 may consist of a gutter 312 and 313 (e.g., a margin) that may be positioned to the left for left pages and the right for right pages.

The gutter system may already be present in multiple learning or teaching books so that students can manually augment the book with notes while reading a specific page or chapter. However, in some instances, an original publication may be reformatted to include a gutter 312 and/or 313 as depicted in FIG. 3A. The systems and methods described herein may utilize the gutter 312 and/or 313 further advance the experience of study, recall, and note-taking patterns while adding additional dimensions to pre-existing studying or learning behaviors. For example, this may be accomplished by adding AR identifiers 314 that may be lined up with section headers 316 and other book elements (e.g., such as chapters, images, tables, or the like) to indicate that they are associated with concomitant augmentation (e.g., AR links when scanned with an electronic device). It is understood that this is only one example and that other configurations are also possible within the scope of the present disclosure.

Figure 3B:
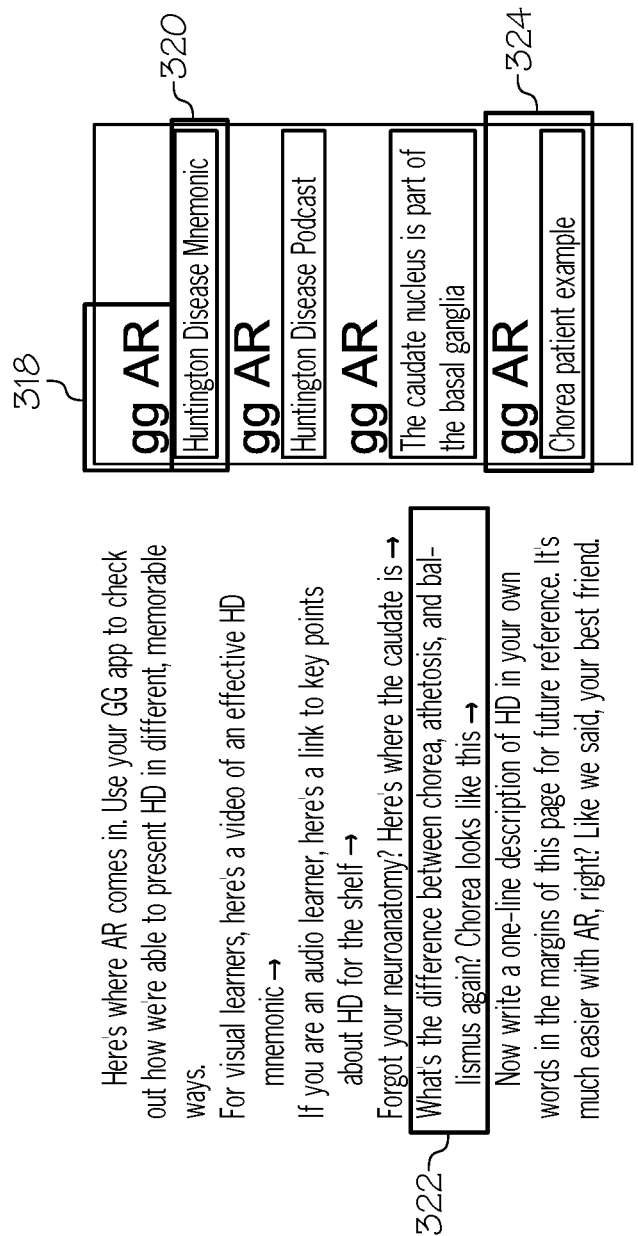
FIG. 3B depicts an illustrative example of an AR identifier system, according to one or more embodiments shown and described herein.

FIG. 3B provides an illustrative example of an AR identifier 324. An AR identifier 324 may include visual cues and "AR" marks 318 that tie book content to additional content through augmentation. Additionally, the AR identifier 324 may include a short title and/or description 320 that aids in bringing together memorization and localization while also providing a brief preview of the subject matter of the AR content that is available through the electronic device 104. In some embodiments, the AR identifier 324 may be positioned based on the content type (e.g., header, paragraph, images or the like) being augmented. That is, AR identifiers 324 may be placed in line or adjacent to the content in the publication, which the AR identifier is directed to. In tight gutters, extra arrows ("→") are sometime added to reinforce placement offsets between the AR identifier 324 and the content of the publication 322.

With such visual qualities and details, these elements provide the scanning and/or page detection system with visual cues and distinctions to detect the correct pages where these AR identifiers reside without needing to rely on traditional methods such as mapping, scanning, and detection, for example, of QR codes.

Figure 4:
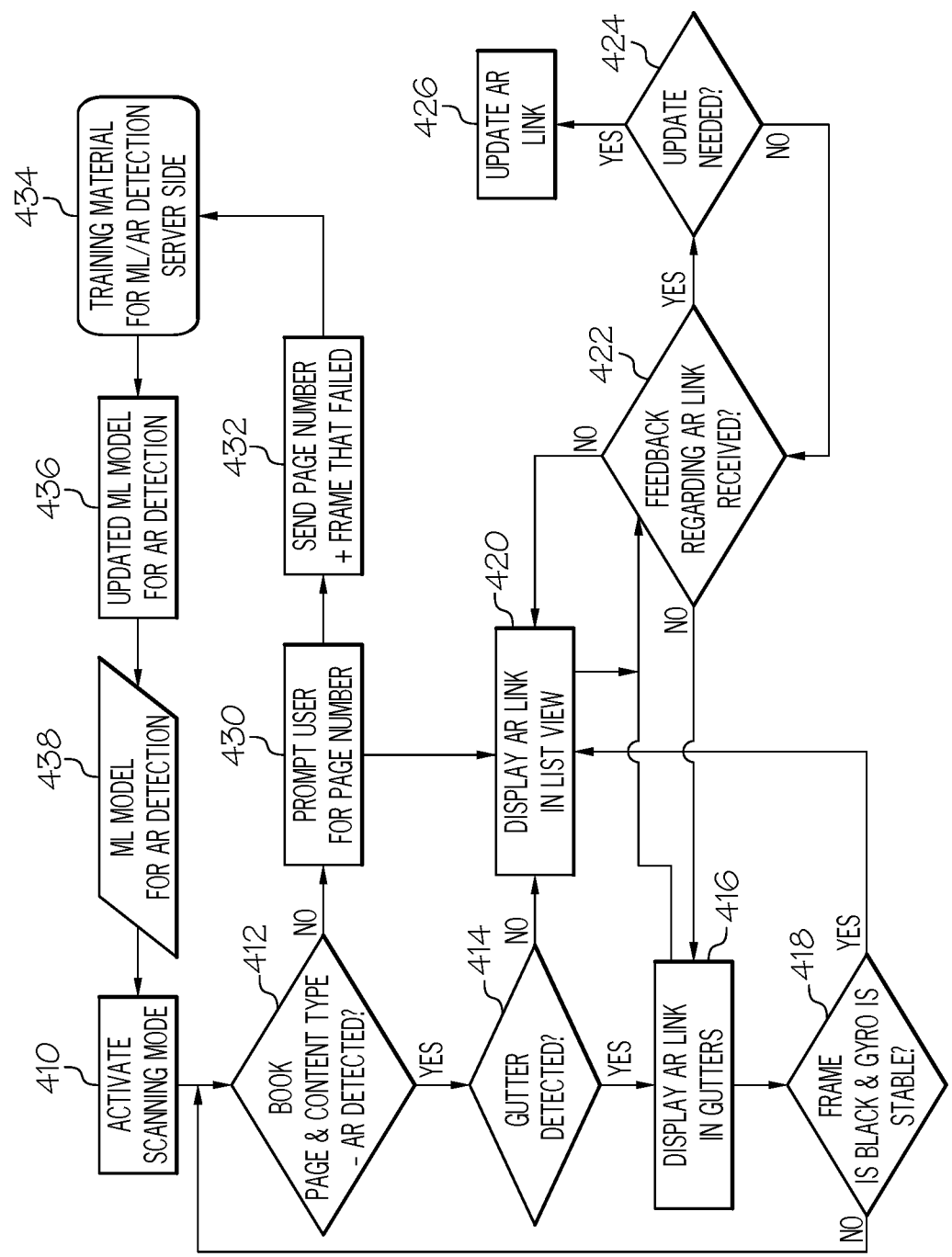
FIG. 4 depicts an illustrative flowchart of the process providing concomitant augmentation via learning interstitials for publications, according to one or more embodiments shown and described herein.

Referring now to FIGS. 4-12B, systems and methods for providing concomitant augmentation via learning interstitials for publications and example interfaces will now be described. FIG. 4 depicts an illustrative flowchart of the process for providing concomitant augmentation via learning interstitials for publications. In particular, the flowchart depicts processes implemented by the mobile application of the electronic device, computing device and/or the server to detect pages of a publication, provide augmentation corresponding to a publication, train and/or update a machine learning model for detecting AR content in a publication and solicit and procure feedback from a user to improve and update the system.

In some embodiments, the page detection and scanning system provides a mobile application with a page & localization (e.g., positioning) process that may be used to anchor the learning interstitials (i.e., AR links) associated with the source content type (e.g. paragraph, heading, table, image, or the like) in the associated gutter/margin position. The page detection and scanning system may include a machine-learned algorithm for identifying pages and locations within the page for anchoring the learning interstitials. For example, the page detection and scanning system may be trained with sets of pictures frames that are specific to example pages and particular gutter and/or content combinations. Once the system detects a page, the learning interstitials may then appear in or near the corresponding AR identifiers within the mobile application frame on the display of the electronic device.

Referring now to FIG. 4 in detail, at block 410, a scanning mode is activated. The scanning mode causes a camera of an electronic device to capture image data. The activation of the scanning mode may occur automatically upon initialize or opening the application through an interface on the electronic device. In some embodiments, a user may active scan mode by selecting a graphical user interface prompt once the application on the electronic device launches. Once the system is collecting image data, the image data is analyzed using one or more image or pattern recognition algorithms and/or a machine learning model to detect the presence of a publication captured in the image data at block 412. Furthermore, at block 412 the image data is analyzed to determine the presence of one or more AR identifiers. An AR identifier may be a visual cue published in the gutter of the publication. In other embodiments, the AR identifier may be a section of text, an image, a heading, or the like that makes up the original publication. That is, in some instances, a specific or unique addition to the publication may not be needed to implement the AR identifier. If a publication is detected and at least one AR identifier is identified within the image data of the publication, the system may continue to block 414. At block 414, the system determines whether the publication includes a gutter. If the publication includes a gutter, then at block 416 the system generates an AR link corresponding to the AR identifier and displays the AR link as an overlay to the image data of the publication on a display of the electronic device. The AR link functions as a selectable link that a user may select through a touch sensor input device by tapping on the display of the electronic device to access the additional learning content.

Returning to block 414, if no gutter is detected then the system proceeds to block 420 and generates an AR link corresponding to the identified AR identifier and displays the AR link in a list view on the display of the electronic device. Similar to the AR link that is displayed as an overlay, the AR link in the list view may also be selectable by a user to access additional learning content. In the event the motion sensor indicates no or a stable state of the electronic device and/or analysis of the image data indicates that the image data no longer depicts the publication or the image data is black (e.g., the camera is blocked by a surface) at block 418, then the display of the electronic device is transitioned from an augmented reality display to a list view of the AR link. As long as the electronic device is not stable and/or the image data does not indicate a black or blank image captured by the camera, the system continues to scan and analyze image data captured by the camera.

In some embodiments, a user may be able to provide feedback on the usefulness and functionality of the content provided through the AR link. Once the user accesses or views the AR link and/or its associated content, the user may input feedback. Feedback may be solicited automatically by the mobile application or the user at the user's discretion may manually input it. In some embodiments, a feedback prompt may be a popup notification on the electronic device. In other embodiments, the user may swipe left and/or right on the AR link that is displayed on the electronic display to access various options for providing feedback. At block 422, the system determines whether feedback regarding the AR link has been input by a user. If so, the feedback is optionally transmitted to a server or computing device for analysis. Feedback may include a score defining a level of likeability of the content provided by the AR link. For example, if the score is below a predetermined threshold or a predetermined quantity of scores are received indicating dislike for the content associated with an AR link, and then the AR link may be updated to include new content or removed. In some embodiments, the feedback includes an indication that the AR link is functioning or not. If the feedback indicates that the AR link does not link to the correct content, fails to link to content, or otherwise does not operate as desired, an update to the AR link is needed is determined at block 424. At block 426, the AR link is updated. In some embodiments, a flag or data value may be used to indicate whether an update is needed based on the feedback.

Returning to block 412, in the event analysis of the image data is unable to detect any AR identifiers, a user may be prompted to enter the page number or other reference to the location of the publication that is being scanned at block 430. The page number and one or more frames from the image data, where an AR identifier was not identified, may be sent to a server or computing device for further analysis at block 432. In some embodiments, when it is determined the image data included an AR identifier but the system was not able to identify it, the system may incorporate the frames of the image data with the training data for training the machine learning model configured to detect AR identifiers at block 434. At block 436, the machine learning model may be retrained or updated using the added frames from the image data when the system failed to identify the AR identifiers in the publication. A new and/or updated machine learning model is then distributed to the electronic devices that are operating a version of the mobile application at block 438.

Figure 5:
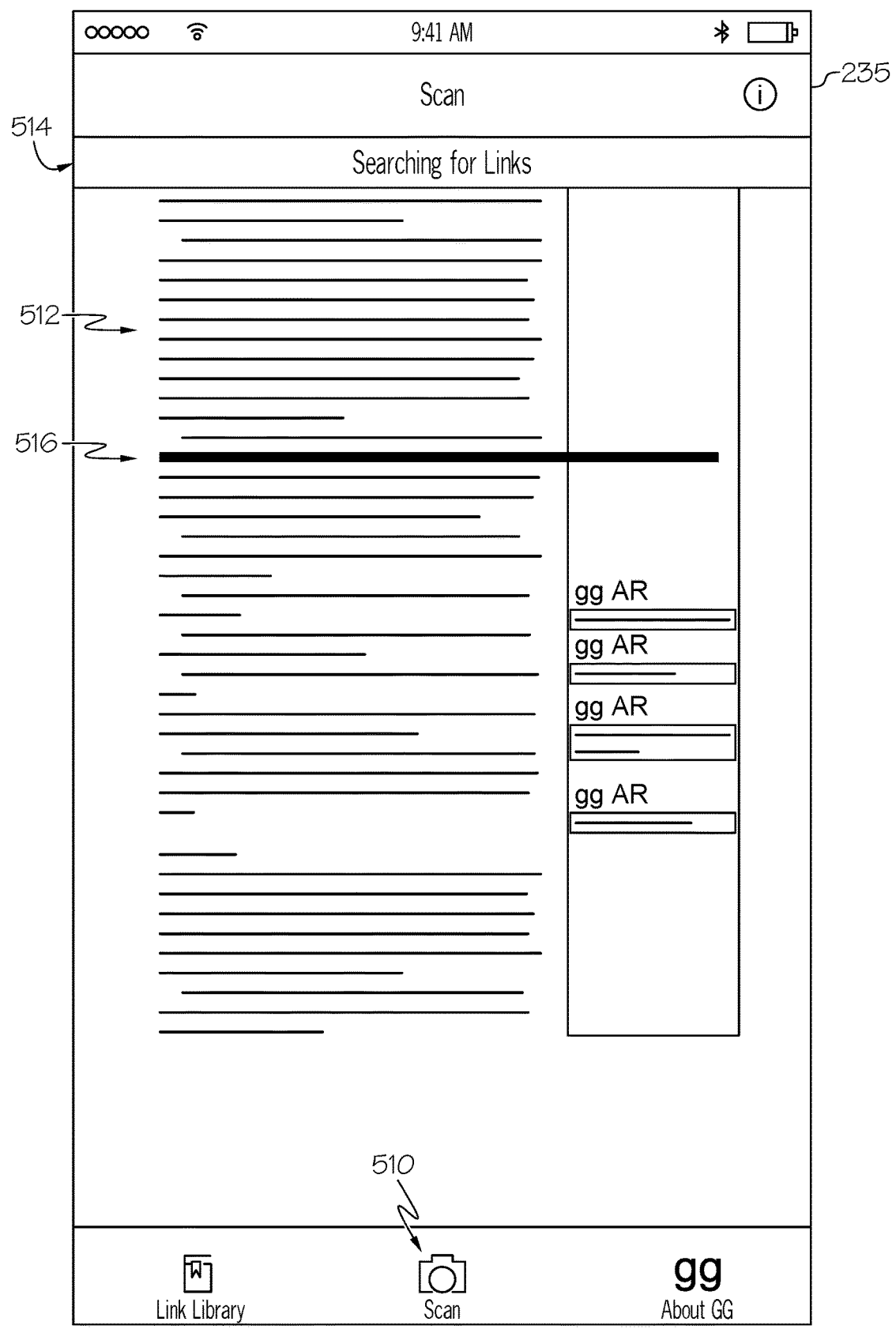
FIG. 5 depicts an example display of an electronic device configured in scanning mode for scanning a publication, according to one or more embodiments shown and described herein.

Referring now to FIG. 5, FIG. 5 depicts a display 235 of an electronic device displaying an example page of a publication for scanning. In operation, for example, the scanning may be summoned at any time through a mobile application by pressing the "Scan" icon 510 in the navigation bar. Once this mode is enabled, the main view of the mobile application displays the live feed from the mobile device's camera. The image, presented from the camera, may be the result of a user focusing the camera of the mobile device above a book page that is being scanned 512. The system indicates to the user via a simple textual message/UI annotation 514 that the scanning mode is enabled and searching for the page and/or links match to the camera feed. In some embodiments, while the mobile application is scanning for a match between the image training set and the current camera feed, the system may display a visual indicator 516 in the foreground of the camera feed that mimics a scan line going up and down. After a certain time threshold and camera feed stability/communality (e.g., live feed has not changed) the system then automatically engages a subsequent mode.

Figure 6:
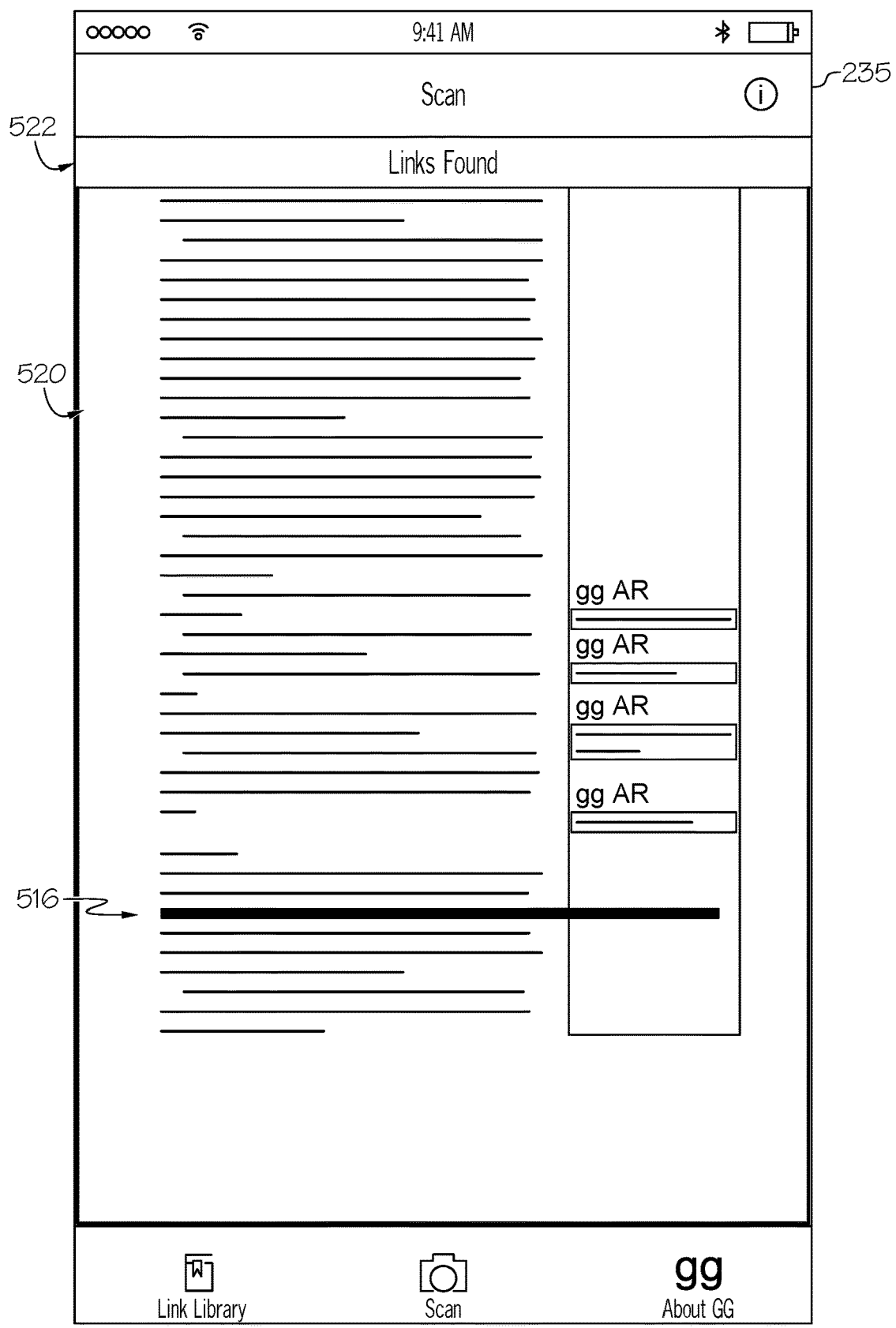
FIG. 6 depicts an illustrative example display of the mobile application interface where the system has identified a match between the training material and the image data from a camera of the electronic device, according to one or more embodiments shown and described herein.

Referring now to FIG. 6, an illustrative example display of the mobile application interface where the system has found a match between the learning set and the camera live feed is depicted. That is, when the system finds a match between the learning set and the current camera feed 520 (e.g., the image data, which may be still images or continuous frames captured by the camera), a series of visualizations may be displayed to the user. For example, a clear user message and User Interface (UI) annotation 522 (e.g., "Links Found") that indicates that such a match has been established may be displayed. As another example, a visual animation and/or transition from the visual indicator 516 of the scanning bar to the full contour of the camera feed 520 may be depicted. The animation/transition may be used to emphasize the capture and mapping from the camera feed to the next phase, when the actual link will be tracking against and overlaid above the AR box.

Figure 7:
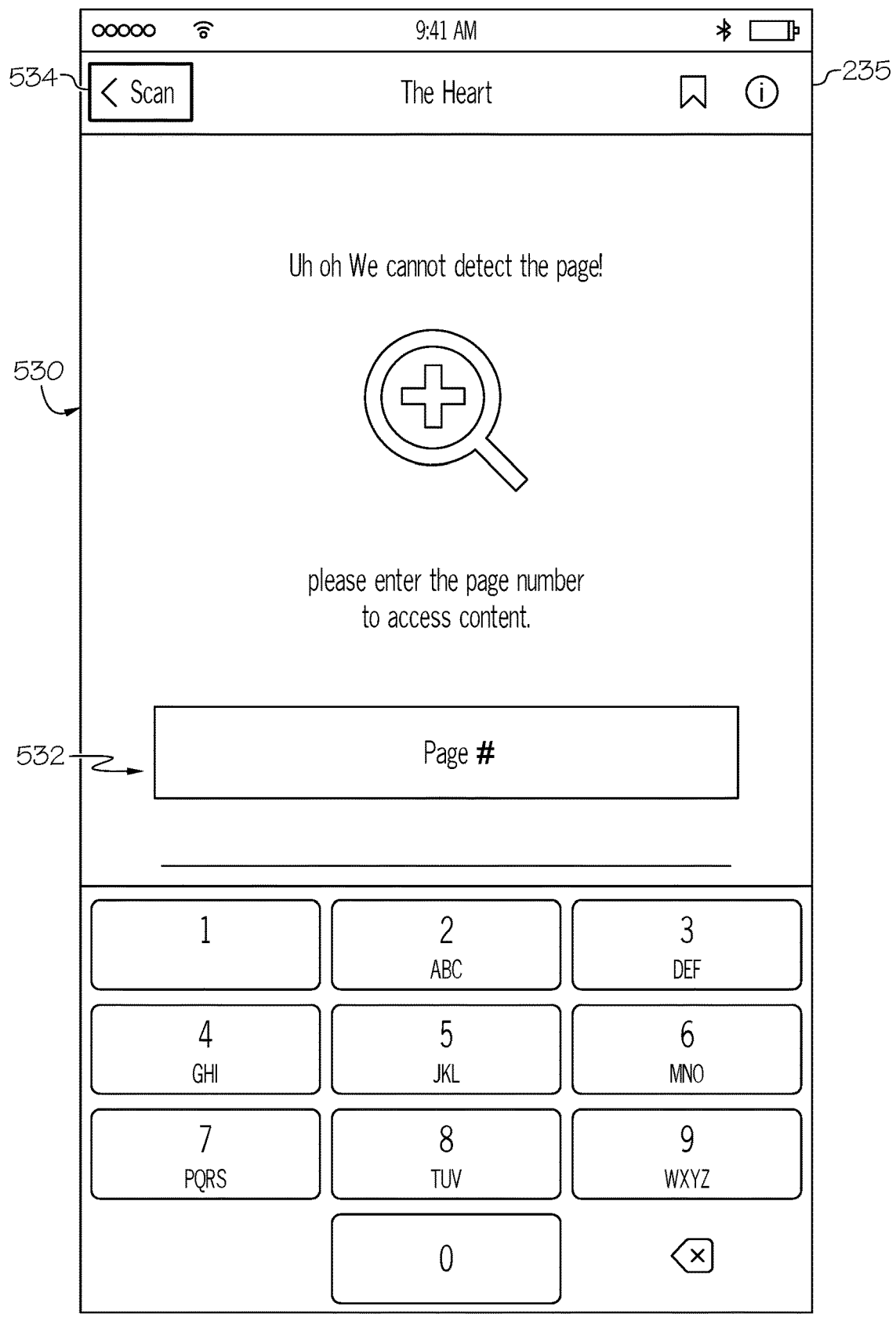
FIG. 7 depicts an example illustration of the user interface (UI) displayed on an electronic device to a user when the page detection/scanning system fails to identify the page and/or AR identifiers that match the training material, according to one or more embodiments shown and described herein.

However, when the page detection/scanning system fails to identify the page and/or AR links to match with the training set, the mobile application may enter a subsequent mode. For example, FIG. 7 depicts an example illustration of the UI presented to a user on a display 235 of the electronic device when the page detection/scanning system fails to identify the page and/or links to match with the training set. In such an instance, the system may provide an alternate access method in which unsuccessfully scanned links can be corrected and/or accessed by manual interaction with the system. For example, the system may show an UI overlay 530 that indicates the difficulty the system is having in finding a match. This UI overlay may be presented on top of the last frame capture that did not yield a positive match. The user may be invited to enter the page number 532 manually via the mobile device's keyword input. The user may also decide to go back to the scanning mode 534 to continue scanning the current page or any other page of the publication.

When a user manually enters a page number, the failed frame and user page input are then sent to a server that collects all these pairs (e.g., the frame of the failed image and page number). These failed images may be used to improve the detection algorithm by extending the learning/training material for detection/mapping of the machine learning model. The improvements to the scanning/mapping system can then be redistributed to all the users of the mobile application via subsequent updates to the application distributed through the different mobile application stores or automatic updates.

Figure 8:
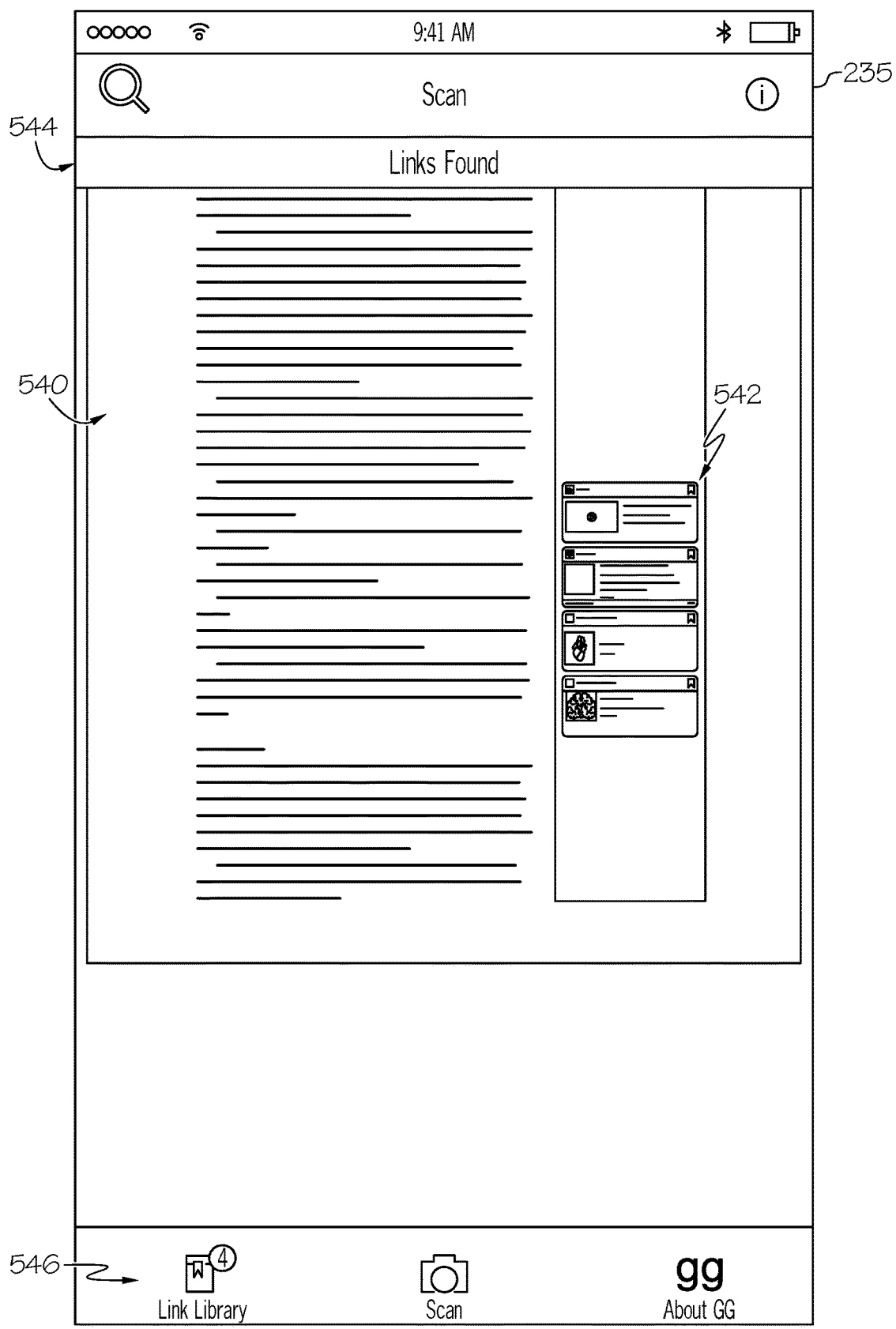
FIG. 8 depicts an illustrative example display of the mobile application for an electronic device when the page detection/scanning system positively indicates a match between the image data and the training material, according to one or more embodiments shown and described herein.

Turning to FIG. 8, when the page detection/scanning system positively indicates a match between the camera image and the learning set, learning interstitials 542 (also referred to herein as AR links) are displayed. For example, once the system has indicated a scanning match the next step is to enable the tracking of the learning interstitials 542 with the AR identifier from the physical book via the mobile device's camera live feed 540. In such an instance, the user is informed that the AR links have been found via a UI affordance/message 544 that may then fade out while an AR link count is displayed 546 next to the "Link Library" navigation link. In the particular case depicted in FIG. 8, four new AR links (i.e., Learning Interstitials) have been found from the resulting scanning of the page. Hence, the numeral "4" may be displayed next to the "Link Library" 546.

Figure 9:
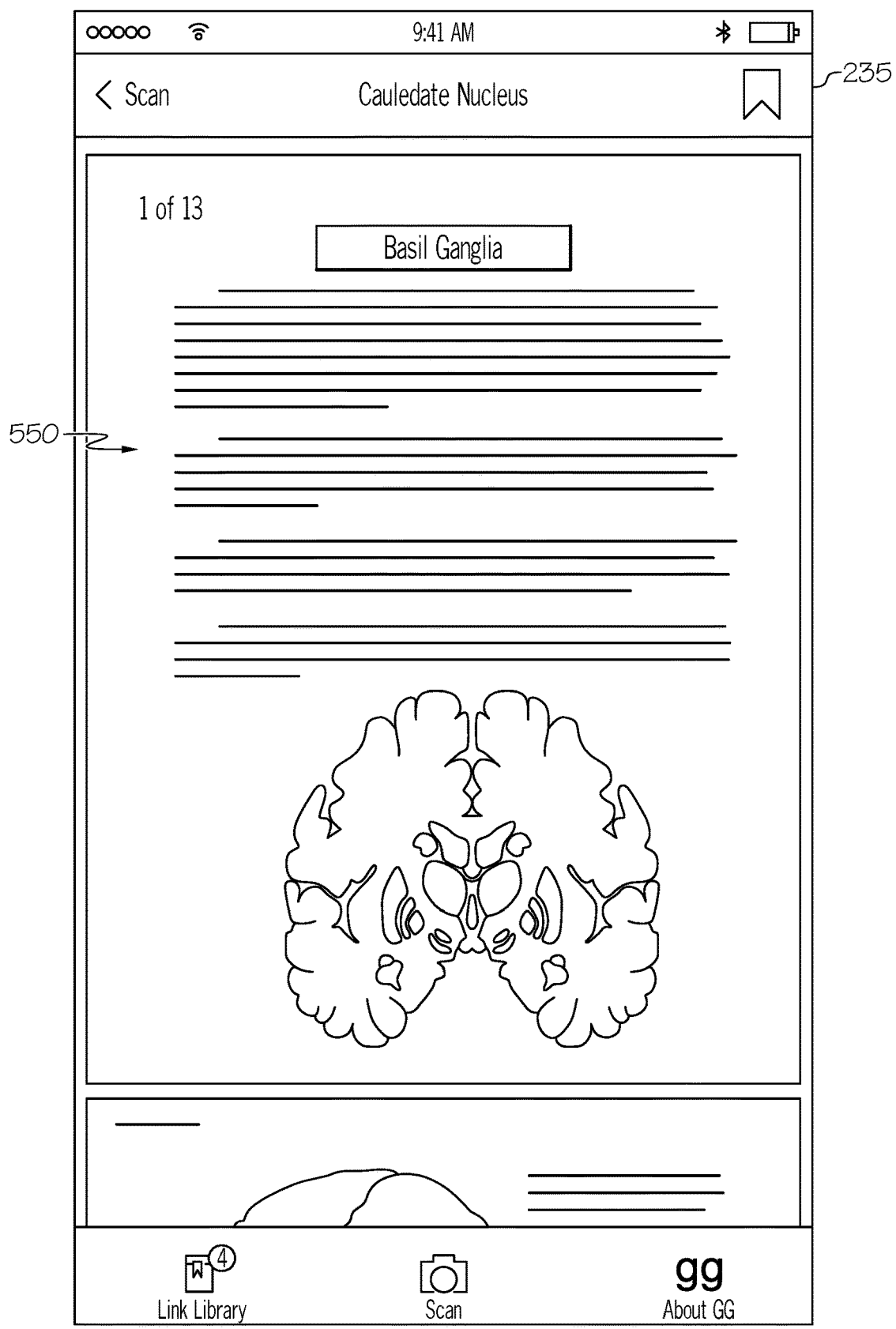
FIG. 9 depicts an illustrative example of content in the form of a PDF document opened from an AR link, according to one or more embodiments shown and described herein.
Figure 10A:
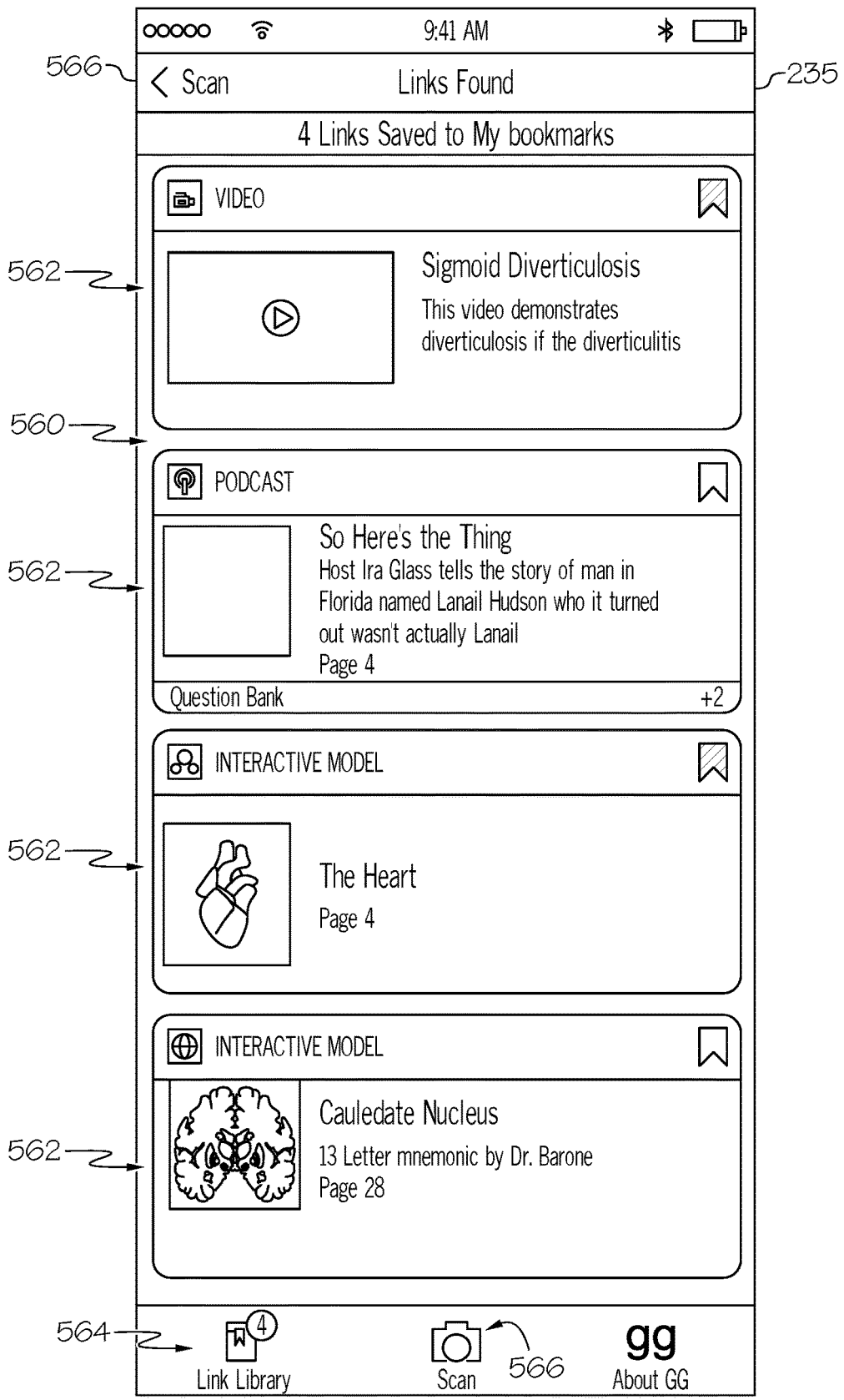
FIG. 10A depicts an illustrative example of a list view on the display of the electronic device within the mobile application, according to one or more embodiments shown and described herein.

While in the AR link tracking/display mode, as depicted for example in FIG. 8, the system will continue to display the AR links in real time over the mobile device's camera feed and adjust their position to match the physical counterpart in the book gutters. From this mode and based on the live camera frame conditions, gyro state, and user interactions, at least four different outcomes may result. First, if the user selects any of the AR links, the system may enter a full-screen playback mode that is specific to the AR link media type (e.g., video player for a video link, PDF viewer for a PDF link). FIG. 9 depicts an illustrative example of a PDF 550 opened from an AR link. Second, if the user swipes the main camera feed while in AR link tracking view, then a list view of the current AR links (i.e., Learning Interstitials) may be displayed, for example, as depicted in the illustrative display 235 depicted in FIG. 10A. Third, if the mobile device's camera feed loses the AR Box tracking, then the system is put back in Scanning Mode. For example, the mode depicted and described with reference to FIG. 5. Fourth, if the mobile device's camera detects a black frame and the gyro is stable, then the system is put in a list view that displays the current AR links/Learning Interstitials, for example, as depicted in FIG. 10A. This condition may occur when the device is put down on a table, presumably next to the book that was being scanned.

Figure 10B:
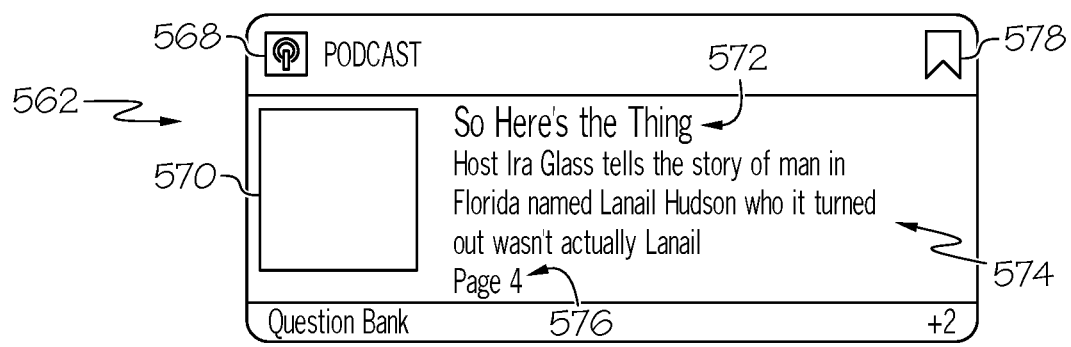
FIG. 10B depicts and illustrative example of an AR link, according to one or more embodiments shown and described herein.

Referring to FIG. 10A in more detail, FIG. 10A depicts an illustrative example of a display 235 of an electronic device where the AR links 562 are displayed in a list view within the mobile application. The list display may be summoned, for example, without limitation, 1) when the user swipes out of the AR tracking mode or 2) from that same mode when the system automatically detects a black frame and/or the gyro from the mobile device is stable. The list view may be displayed over the last camera frame from the AR tracking mode, which now becomes the background 560 for this new mode. AR Links 562 may follow the same visual representation as the AR tracking mode but offer more visual real estate. The UI navigation menu 564 from AR tracking mode may also be carried over, and the user can easy re-invoke the Scanning mode via two UI navigation affordances 566. The AR Links 562 may be displayed using a card representation. Referring to FIG. 10B which highlights one card of an AR link is depicted for a more detailed explanation. For example, the card representation may include: an icon 568 representing the type of content in the AR link, a preview thumbnail 570 that aids in memorization/localization, a curated title 572 that matches the content type being augmented, a curated description 574 that also aids in memorization/localization, the page number 576 that indicates the page of the publication that the card corresponds to, and a bookmark option 578 having the capability to bookmark a card for quick access in the future.

Figure 11:
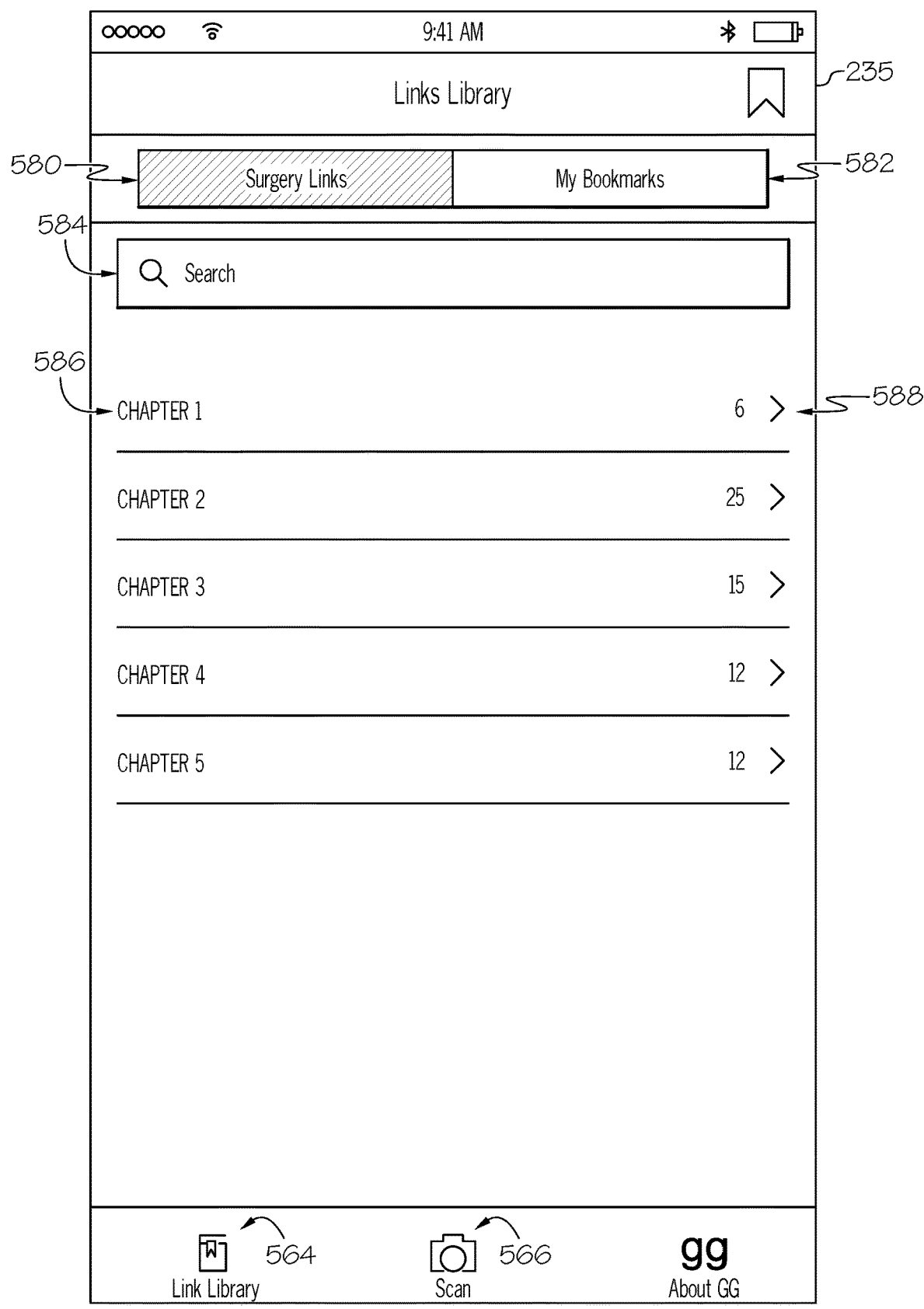
FIG. 11 depicts an illustrative example of an AR link library content summary interface, according to one or more embodiments shown and described herein.

Referring now to FIG. 11, an illustrative example of an AR link library content summary interface as displayed on a display 235 of the electronic device is depicted. The AR link library provides the ability to view the learning interstitials without entering scanning mode, thus providing a quick and fluid way to recall and view learning interstitials outside of the context of the book. The AR Link Library 564, as well as the scanning mode 566, may be entered via the navigation menu. The AR Link Library may be organized in two main sections that store all the links. The first section 580 may be for all the links from the current book where the AR links are organized by chapter. The second section may be dedicated to all the AR link bookmarks 582, and they may also be organized by chapter order. For example, each chapter that contains AR links may be displayed in a list 586. For each list item (e.g., chapter) a count 588 of scanned/stored AR links is displayed. For quick access, the user can invoke a search via the search bar 584, and the result may be displayed inline without being organized by chapter for quick access and cross-chapter concept searching.

Referring to FIGS. 12A and 12B, once the user clicks on a given chapter list item 586 (e.g., as depicted in FIG. 10) the system displays a list view comprised of one card for each AR link captured in the previous AR scanning sessions. The user may navigate back to the AR Link Library via either the main navigation 564A or the secondary navigation 564B. The user may also summon the Scanning Mode from the navigation menu 566. One option for providing feedback on an AR link is through the AR Link Library. In some embodiments, by swiping left on a given AR Link card, the user can either report a broken link 590 or delete 592 this AR link from the library. In the case of a broken link, the system will send a message to the digital publishing platform informing the book project team of the problem and allowing them to resolve it. Alternatively, by swiping right on a given AR link card, the user may show appreciation 594 or dislike 596 for this specific AR link. In both cases, the system will send a message to the digital publishing platform to notify the book project team and enable them to evaluate the feedback and decide if a new link target is required and/or desired.

Figure 13B:
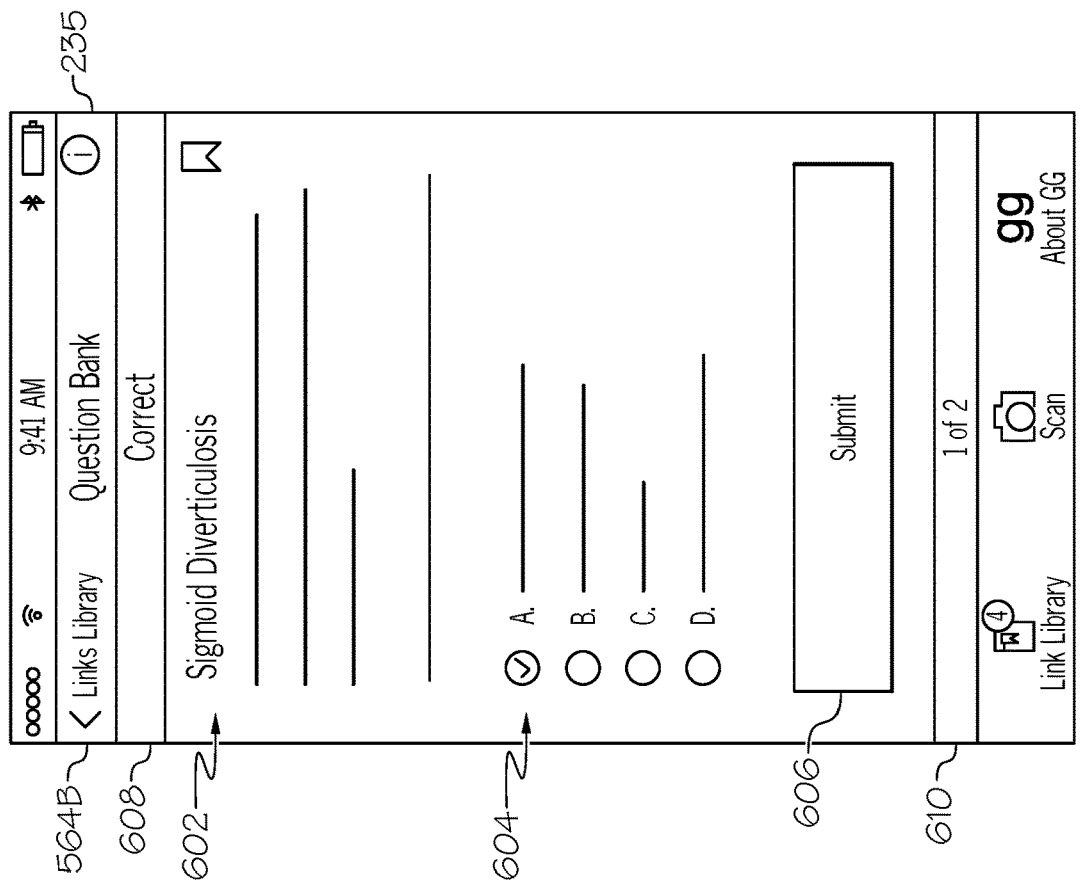
FIG. 13B depicts an illustrative example of a Question when a user selects the Question Bank link on the AR link, according to one or more embodiments shown and described herein.
Figure 13A:
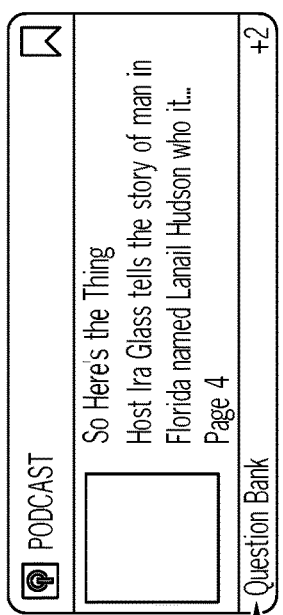
FIG. 13A depicts an illustrative example of a Question Bank interface, according to one or more embodiments shown and described herein.

Referring now to FIGS. 13A and 13B, an illustrative example of an illustrative example of a Question Book interface is depicted. From the AR Link Library, the user may also explore questions that have been associated with the Learning Interstitials by clicking on the "Question Bank" banner 600 at the bottom of AR link cards that have such UI indicators. Once the user clicks on a given question bank link/banner, the system displays the associated question bank related to that specific AR link card. The question bank screen, for example as depicted in FIG. 13B, may include a title and body 602 for the question, a section dedicated to the answer: True/False, multiple choice, or any other type of answer output 604, a button 606 that the user clicks to confirm the completion of the question, a user message and UI annotation 608 that indicate that the answer is correct or incorrect, and a visual affordance 610 that indicates the number of question that are part of this specific question bank. The user may also navigate back to the AR Link Library either via the navigation menu 564. Furthermore, in some embodiments, the question banks may also be directly authored within digital publishing platform, which will now be described with respect to FIGS. 14-17.

Figure 15:
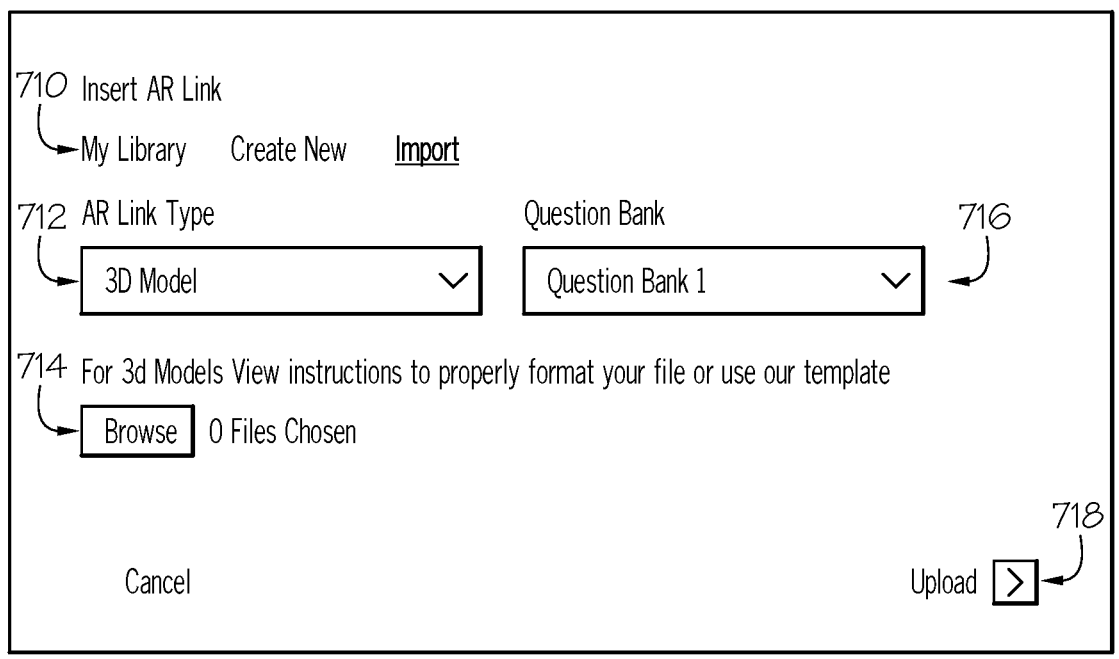
FIG. 15 depicts an illustrative example dialog display where the user can either select an AR link from his library, create a new link, or import one from elsewhere, according to one or more embodiments shown and described herein.

FIG. 14 depicts an illustrative example of a digital publishing platform having an extension for concomitant interstitials authoring into publications. The digital publishing platform may be accessed via a computing device 102 as disclosed with respect to FIG. 2A. FIGS. 14-17 depict example user interfaces that may be displayed on the display 102a of a computing device 102. The digital publishing platform is a tool for editors, authors, and/or staff to plan, write, and produce publications in one unique environment. An advantage of this platform is the ability to preview print-ready manuscript pages while writing and visualize how the publication flows without having to wait for the conventional typesetting or graphic work that usually happens once the manuscript is finalized. In some embodiments, digital publishing platforms provide a rich text editor where members of a book project can write and edit the content of each chapter of a given book. To augment the chapter with a learning interstitial, the user may follow a simple flow. For example, without limitation, a user may select the content type (e.g., paragraph, image, header, table) to be augmented via cursor selection/highlighting 702, then invoke learning interstitial augmentation via an "AR link" 704 UI affordance. This may invoke a dialog, for example, as depicted in FIG. 15, where the user can select an AR link from his library, create a new link, or import one from elsewhere 710. Still referring to FIG. 15, the user may specify the type of interstitial being targeted when created/importing a new link 712. Each learning interstitial type may have a different sub-interaction 714. In the case of a 3D interactive model, the system can also propose a template file to ensure that integration within the system is optimal (e.g., XYZ coordinates, mapping, scale, resolution are configured for display). Each learning interstitial can also be associated with a question bank 716, which may also be defined/authored within the digital publishing platform. The user may finish insertion by uploading/creating the corresponding AR Link 718.

In embodiments, once the AR link has been validated, the system may add a visual affordance 706 (FIG. 14) in the left margin of the authoring space to indicate that a specific content type (e.g., paragraph, heading, image, table, or the like) is supporting Learning Interstitial material (AR links). Finally, the user can preview the actual placement of the AR box within the print manuscript for a given chapter by invoking the "Print Preview" available via 708.

Figure 16:
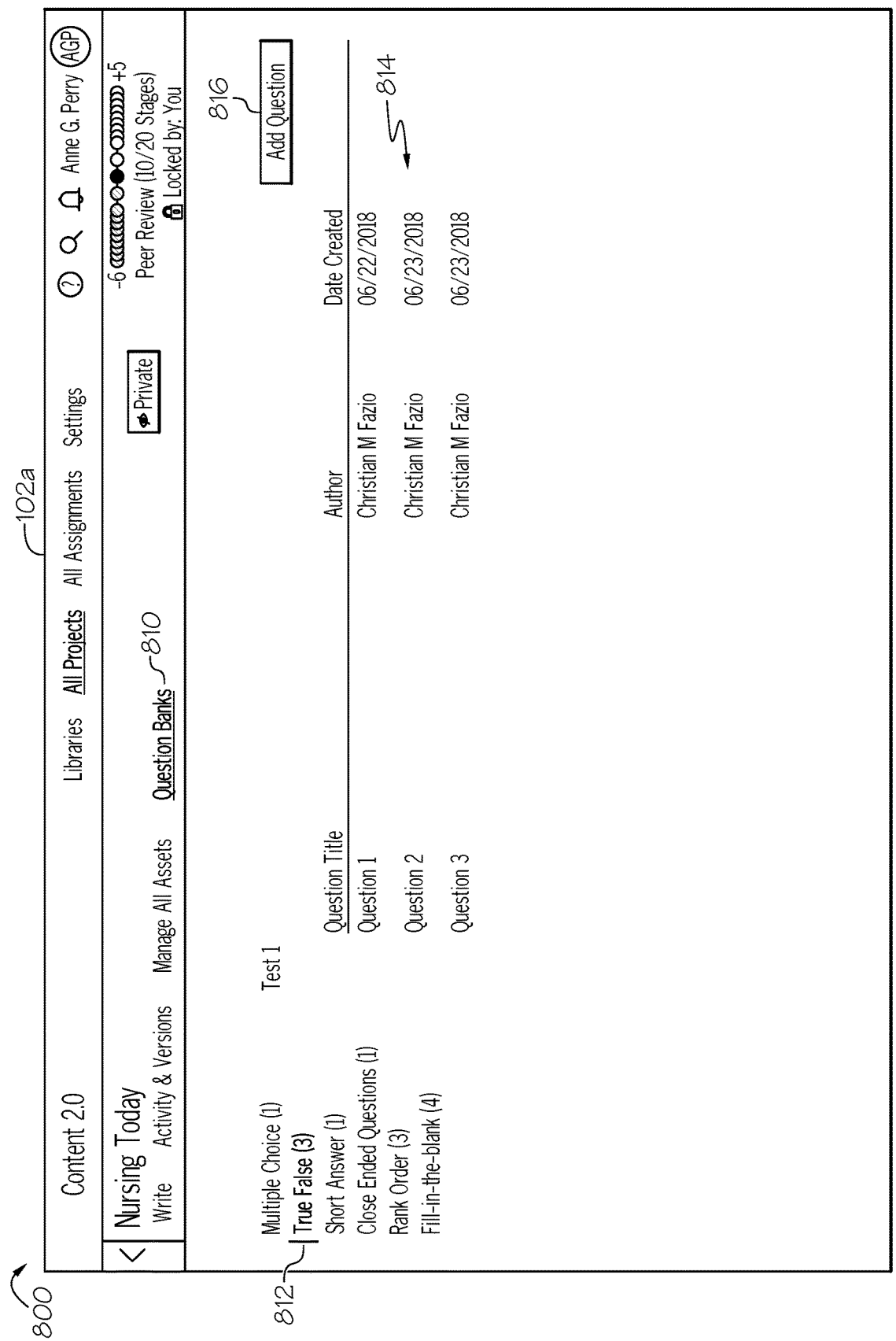
FIG. 16 depicts an illustrative example of a Question Bank interface within the digital publishing platform, according to one or more embodiments shown and described herein.

Referring now to FIG. 16, an illustrative example of a question bank interface 800 within the digital publishing platform is depicted. The digital publishing platform may also support the ability to author question banks that can then be associated with any of the learning interstitial. A "Question Bank" section 810 may be available from within the authoring space. This section tracks all the question types that can be associated. The Question Bank environment may include questions organized by type 812, such as but not limited to: multiple choice, True/False, Short Answer, Rank/Order, Fill-in-the-blank and so on. The question bank environment may also include a list of existing questions 814 corresponding to the selected question type and/or the ability to add a new question 816 and associated modal dialog per type (not shown).

The user can summon the print preview from the main authoring environment (e.g., 708, FIG. 14). The system may generate a PDF print for the full chapter with the corresponding layout and AR Identification Boxes for all content that has been authored to this point. The Print Preview of the PDF can also be used in conjunction with a preview of the Mobile application so that the editor, author, staff member or the like can evaluate the AR link from inside the application itself. This may be done by accessing the latest version of the application available via a downloadable link (e.g., 926 in FIG. 17).

Figure 17:
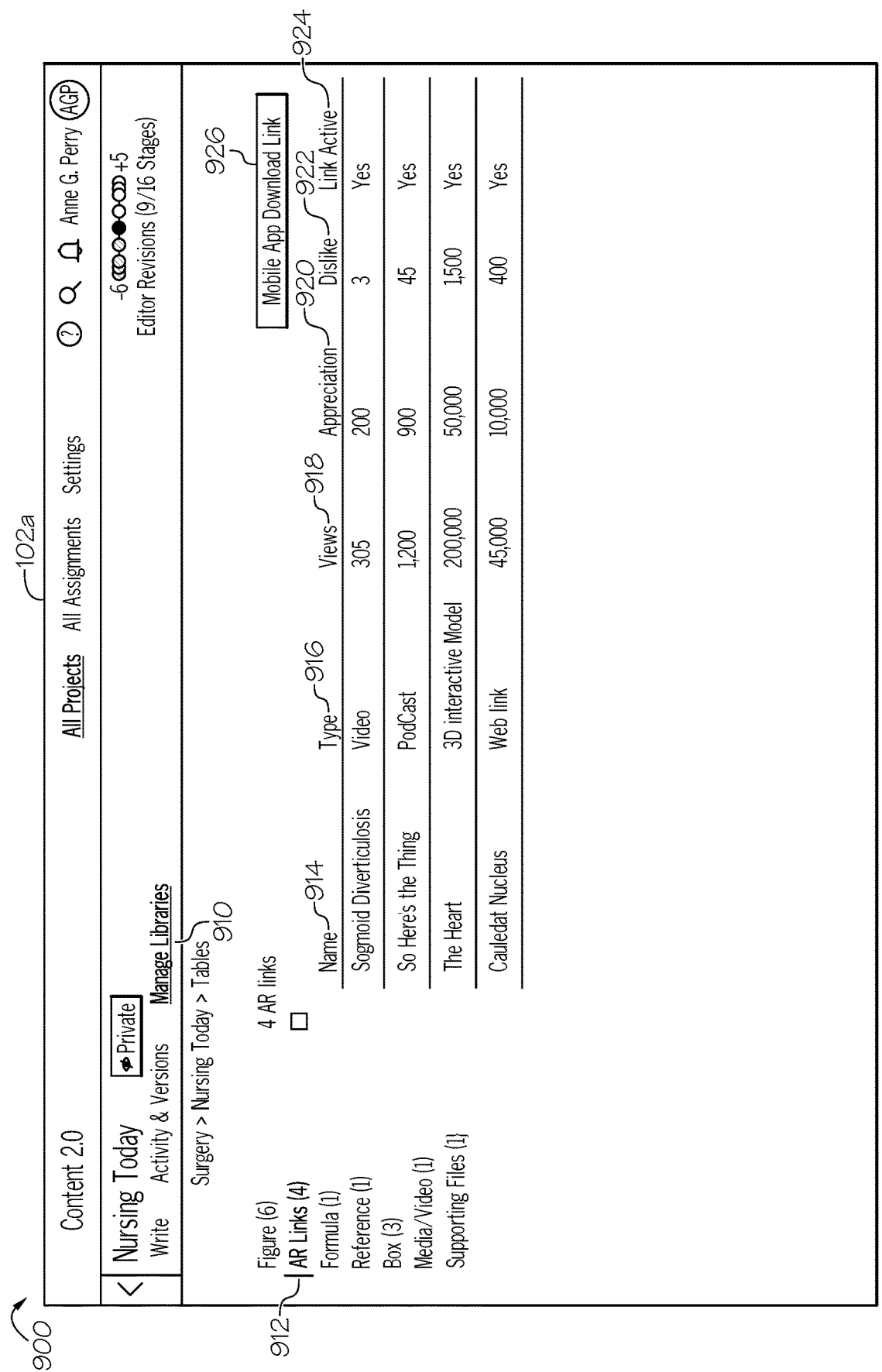
FIG. 17 depicts an illustrative example of a library management interface for managing AR links and feedback from users, according to one or more embodiments shown and described herein.

Referring now to FIG. 17, an illustrative example of a library management interface 900 for AR links is depicted. During the book authoring process, as well as after the book is published, and the mobile app is available to the public, the editor, author, staff member or the like can manage the AR Links and review the analytics associated with them. In the digital publishing platform, a Library section is available 910. This section may track all the elements other than the actual text for a given Chapter. An "AR link" sub-section 912 may provide visibility of all the AR links for this given chapter. In some embodiments, each AR link reporting row includes 1) the AR link curated name 914, 2) the AR link type 916, such as video, podcast, 3D model, web link, PDF or the like, 3) the number of times that AR link was viewed/recalled 918, 4) the number of "likes" received 920, 5) the number of "dislikes" received 922, and/or 6) if the AR link was flagged as broken 922. As discussed above, if a count for dislikes reaches a predetermined threshold the AR link may be removed or updated with new content. Additionally, if an AR link is indicated as not being active then the broken link may be repaired. The update and/or repair may be an automated process or manually completed by an administrator.

In some embodiments, a download link 926 to the actual mobile application may also be available. If the book is published this link points to the corresponding mobile application store, but if the book is still in production then the link points to a mobile prototype that is kept updated as the chapters are authored.

It should now be understood that the systems and method described herein relate to developing, managing, launching, and providing concomitant augmentation via learning interstitials for books and publication through a digital publishing platform. The system may include a mobile device having an application enabled to scan text of a book and provide AR links thereby providing learning interstitials to a user. The system may also include a digital publishing platform for developing content, managing AR links, launching an application for the user and creating concomitant augmentation via learning interstitials.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing concomitant augmentation via learning interstitials for publications, the method comprising:

activating a scan mode, wherein the scan mode causes a camera of an electronic device to capture image data;

determining the presence of a publication captured in the image data;

analyzing the image data of the publication to determine the presence of an augmented reality (AR) identifier;

in response to identifying the presence of the AR identifier within the publication captured in the image data, displaying, on a display of the electronic device, the image data of the publication and an AR link that corresponds to the AR identifier, wherein the AR link is displayed as an AR overlay to the image data of the publication; and in response to failing to identify the AR identifier within the publication captured in the image data:
prompting a user to input a page number of the publication captured in the image data; and
displaying the AR link that corresponds to the page number of the publication input by the user, wherein the AR link is displayed in a list view on the display of the electronic device.

2. The method of claim 1, wherein analyzing the image data of the publication includes utilizing a machine learning model configured to detected one or more AR identifiers within the image data of the publication.

3. The method of claim 2, further comprising:
transmitting the page number input by the user and the image data of the publication to a server configured to train the machine learning model; and
receiving an updated machine learning model from the server, wherein the server incorporates the image data of the publication captured when the machine learning model failed to identify the presence of the AR identifier within the image data of the publication and in response updates the machine learning model.

4. The method of claim 1, further comprising:
receiving a feedback from the user regarding the AR link; and
updating a content or a functionality of the AR link when the feedback indicates an update is needed.

5. The method of claim 4, wherein the feedback includes a score defining a level of likeability of the content provided by the AR link, and when the score is below a threshold value the feedback indicates an update is needed.

6. The method of claim 4, wherein when the feedback includes an indication that the AR link is not functioning, the feedback indicates an update is needed.

7. The method of claim 1, further comprising adding an identified AR Link to an AR link library that corresponds to the publication.

8. The method of claim 1, further comprising detecting a gutter within the publication and wherein the AR link is displayed in the gutter of the publication.

9. A system for providing concomitant augmentation via learning interstitials for publications comprising:
an electronic device comprising a display and a camera;
a processor communicatively coupled to the display and the camera; and
a non-transitory, processor-readable memory coupled to the processor, the non-transitory, processor-readable memory comprising a machine readable instruction set stored thereon that, when executed by the processor, causes the processor to:
activate a scan mode, wherein the scan mode causes the camera of the electronic device to capture image data;
determine the presence of a publication captured in the image data;
analyze the image data of the publication to determine the presence of an augmented reality (AR) identifier;
in response to identifying the presence of the AR identifier within the publication captured in the image data, display, on the display of the electronic device, the image data of the publication and an AR link that corresponds to the AR identifier, wherein the AR link is displayed as an AR overlay to the image data of the publication; and
in response to failing to identify the AR identifier within the publication captured in the image data:
prompt a user to input a page number of the publication captured in the image data; and
display the AR link that corresponds to the page number of the publication input by the user, wherein the AR link is displayed in a list view on the display of the electronic device.

10. The system of claim 9, wherein analyzing the image data of the publication includes utilizing a machine learning model configured to detected one or more AR identifiers within the image data of the publication.

11. The system of claim 10, further comprising a server communicatively coupled to the electronic device, wherein the machine readable instruction set, when executed, further causes the processor to:
transmit the page number input by the user and the image data of the publication to the server configured to train the machine learning model;
wherein the server is configured to:
incorporate the image data of the publication, when the machine learning model failed to identify the presence of the AR identifier within the image data of the publication, with training material for the machine learning model; and
update the machine learning model for detecting the one or more AR identifiers based on the image data of the publication.

12. The system of claim 9, wherein the machine readable instruction set, when executed, further causes the processor to:
receive a feedback from the user regarding the AR link; and
update a content or a functionality of the AR link when the feedback indicates an update is needed.

13. The system of claim 12, wherein the feedback includes a score defining a level of likeability of the content provided by the AR link, and when the score is below a threshold value the feedback indicates an update is needed.

14. The system of claim 12, wherein when the feedback includes an indication that the AR link is not functioning, the feedback indicates an update is needed.

15. The system of claim 9, wherein the machine readable instruction set, when executed, further causes the processor to: add an identified AR Link to an AR link library that corresponds to the publication.

16. The system of claim 9, wherein the machine readable instruction set, when executed, further causes the processor to: detect a gutter within the publication and wherein the AR link is displayed in the gutter of the publication.

17. An electronic device configured with an application for providing concomitant augmentation via learning interstitials for publications comprising:
a display;
a camera;
a processor communicatively coupled to the display and the camera; and
a non-transitory, processor-readable memory coupled to the processor, the non-transitory, processor-readable memory comprising a machine readable instruction set stored thereon that, when executed by the processor, causes the processor to:
activate a scan mode, wherein the scan mode causes the camera of the electronic device to capture image data;

determine the presence of a publication captured in the image data;

analyze the image data of the publication to determine the presence of an augmented reality (AR) identifier;

in response to identifying the presence of the AR identifier within the publication captured in the image data, display, on the display of the electronic device, the image data of the publication and an AR link that corresponds to the AR identifier, wherein the AR link is displayed as an AR overlay to the image data of the publication; and in response to failing to identify the AR identifier within the publication captured in the image data:

prompt a user to input a page number of the publication captured in the image data; and display the AR link that corresponds to the page number of the publication input by the user, wherein the AR link is displayed in a list view on the display of the electronic device.

18. The electronic device of claim 17, wherein analyzing the image data of the publication includes utilizing a machine learning model configured to detected one or more AR identifiers within the image data of the publication.

19. The electronic device of claim 18, wherein the machine readable instruction set, when executed, further causes the processor to:

transmit the page number input by the user and the image data of the publication to a server configured to train the machine learning model; and receive an updated machine learning model for detecting the one or more AR identifiers based on the image data of the publication.

20. The electronic device of claim 17, wherein the machine readable instruction set, when executed, further causes the processor to:

receive a feedback from the user regarding the AR link;

transmit the feedback to a computing device for updating the AR link; and receive, from the computing device, updated content or functionality of the AR link in response to the transmitted feedback.

* * * * *